US012744325B2

(12) United States Patent
Chen et al.

(10) Patent No.: US 12,744,325 B2
(45) Date of Patent: Sep. 22, 2026

(54) ANTENNA AND BASE STATION

(71) Applicant: HUAWEI TECHNOLOGIES CO., LTD., Shenzhen (CN)

(72) Inventors: Bin Chen, Dongguan (CN); Zihui Liu, Dongguan (CN); Li Zhang, Dongguan (CN); He Cui, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 18/642,843

(22) Filed: Apr. 23, 2024

(65) Prior Publication Data

US 2024/0275067 A1 Aug. 15, 2024

Related U.S. Application Data

(63) Continuation of application No. PCT/CN2022/130347, filed on Nov. 7, 2022.

(30) Foreign Application Priority Data

Nov. 18, 2021 (CN) ......................... 202111370464.8

(51) Int. Cl.

| | |
|---|---|
| ***H01Q 15/14*** | (2006.01) |
| ***H01Q 21/06*** | (2006.01) |
| ***H01Q 21/08*** | (2006.01) |

(52) U.S. Cl.

CPC ......... *H01Q 15/148* (2013.01); *H01Q 21/062* (2013.01); *H01Q 21/08* (2013.01)

(58) Field of Classification Search

CPC ...... H01Q 15/14; H01Q 15/148; H01Q 21/06; H01Q 21/062; H01Q 21/08

See application file for complete search history.

(56) References Cited

U.S. PATENT DOCUMENTS

| | | | | |
|---|---|---|---|---|
| 6,621,465 | B2 | 9/2003 | Teillet et al. | |
| 9,825,607 | B2 * | 11/2017 | Wu | H01Q 1/50 |
| 10,062,940 | B2 | 8/2018 | Liu et al. | |
| 11,043,738 | B2 * | 6/2021 | Yu | H01Q 9/28 |
| 2015/0116180 | A1 * | 4/2015 | Wu | H01P 1/184 333/139 |

(Continued)

FOREIGN PATENT DOCUMENTS

| | | |
|---|---|---|
| CN | 102082327 B | 7/2014 |
| CN | 104201440 A | 12/2014 |

(Continued)

*Primary Examiner* — Hai V Nguyen

(57) ABSTRACT

This disclosure provides an antenna and a base station. The antenna includes a reflector, an insulation support bracket, and a feed network. The insulation support bracket is located on a side of the reflector and includes a first insulation support plate. The feed network and the insulation support bracket are located on the same side of the reflector, the feed network is connected to the insulation support bracket, and the feed network includes a phase-shifting strip line and a first sliding dielectric plate. The first insulation support plate, the phase-shifting strip line, the first sliding dielectric plate, and the reflector are sequentially disposed in a first direction. A reference ground of a phase shifter of the antenna provided in this disclosure is a single-side reference ground, and a structure is simple, so that the antenna can be more lightweight and miniaturized.

20 Claims, 24 Drawing Sheets

(56) References Cited

U.S. PATENT DOCUMENTS

| | | | | |
|---|---|---|---|---|
| 2017/0288306 | A1 | 10/2017 | Sledkov et al. | |
| 2019/0372237 | A1 | 12/2019 | Yman et al. | |
| 2020/0099128 | A1 * | 3/2020 | Yu | H01Q 19/17 |
| 2025/0219296 | A1 * | 7/2025 | Yin | H01P 3/084 |
| 2025/0372868 | A1 * | 12/2025 | Liu | H01P 1/184 |

FOREIGN PATENT DOCUMENTS

| | | | | |
|---|---|---|---|---|
| CN | 106654470 | A | 5/2017 | |
| CN | 107482286 | A | 12/2017 | |
| CN | 107819198 | A | 3/2018 | |
| CN | 109638457 | A | 4/2019 | |
| CN | 111063996 | A | 4/2020 | |
| CN | 112271420 | A | 1/2021 | |
| WO | 2021135269 | A1 | 7/2021 | |
| WO | WO-2021135274 | A1 * | 7/2021 | H01Q 1/38 |

* cited by examiner

ANTENNA AND BASE STATION

CROSS-REFERENCE TO RELATED APPLICATIONS

This application is a continuation of International Patent Application No. PCT/CN2022/130347, filed on Nov. 7, 2022, which claims priority to Chinese Patent Application No. 202111370464.8, filed on Nov. 18, 2021. The disclosures of the aforementioned applications are hereby incorporated by reference in their entireties.

TECHNICAL FIELD

This disclosure relates to the field of antenna technologies, and in particular, to an antenna and a base station.

BACKGROUND

With the rapid development of mobile communication technologies, a higher requirement is imposed on a base station antenna in a communication system. The base station antenna not only needs to implement efficient, fast, and large-capacity communication, but also needs to be highly integrated, miniaturized, and lightweight. The base station antenna may adjust an antenna directivity pattern by disposing a phase shifter to change a phase of a signal in an antenna element, to remotely control and adjust a network coverage area. In an existing antenna, a phase shifter, a power divider, and a radiating element are connected through a cable or by using an adapter pin. The phase shifter requires an independent metal cavity as a radio frequency ground. The antenna has low overall integration, a large quantity of components, and a complex structure. This is not conducive to miniaturization and lightweight of the antenna, and there are many production processes.

SUMMARY

This disclosure provides an antenna that can be miniaturized and lightweight and a base station including the antenna.

According to a first aspect, this disclosure provides an antenna, including a reflector, an insulation support bracket, and a feed network. The insulation support bracket is located on a side of the reflector and includes a first insulation support plate. The feed network and the insulation support bracket are located on the same side of the reflector, the feed network is connected to the insulation support bracket, and the feed network includes a phase-shifting strip line and a first sliding dielectric plate. The first insulation support plate, the phase-shifting strip line, the first sliding dielectric plate, and the reflector are sequentially disposed in a first direction.

In a possible implementation, a reference ground of the phase-shifting strip line is the reflector.

In the foregoing implementation, the first insulation support plate, the phase-shifting strip line, the first sliding dielectric plate, and the reflector are sequentially adjacent in the first direction. There is no other component between the first insulation support plate and the phase-shifting strip line, between the phase-shifting strip line and the first sliding dielectric plate, or between the first sliding dielectric plate and the reflector. There is no ground plane, reflector, metal plate, or other metal material between the first insulation support plate and the phase-shifting strip line. In the foregoing implementation, a main function of the insulation support bracket is to fasten the feed network. A part (the first insulation support plate) in the insulation support bracket and the reflector are reused to clamp on two sides of the first sliding dielectric plate, and no additional component is required to limit a position of the first sliding dielectric plate. In other words, the reflector is reused as a reference ground of a phase shifter, and the part (the first insulation support plate) in the insulation support bracket is reused to limit the position of the first sliding dielectric plate. This improves integration of the antenna, simplifies a structure, and implements lightweight and miniaturization of the antenna.

In an implementation, the first direction is a direction perpendicular to an overall plate surface of the reflector, and the feed network and the insulation support bracket are located on the same side of the reflector in the first direction. In some implementations, the feed network and the insulation support bracket may be stacked on the same side of the reflector in the first direction.

In an implementation, the phase-shifting strip line and the first sliding dielectric plate extend in a second direction, the first sliding dielectric plate can slide in the second direction relative to the phase-shifting strip line, and the second direction may vertically intersect with the first direction. The first direction is a thickness direction of the antenna, and the second direction is a length direction or a width direction of the antenna.

As described above, in an implementation, the first insulation support plate, the phase-shifting strip line, the first sliding dielectric plate, and the reflector are sequentially adjacent and are stacked in the first direction. A manner in which the components are sequentially adjacent and are stacked can improve structural strength of a phase shifter, and avoid a case in which a phase-shifting function cannot be implemented because components in the phase shifter are separated when being impacted.

For ease of assembling the phase shifter, in an implementation, the phase-shifting strip line is located at an edge of the feed network.

In an implementation, the insulation support bracket further includes an insulation support bracket body disposed side by side with the first insulation support plate. A part, other than the phase-shifting strip line, in the feed network is located between the insulation support bracket body and the reflector.

In a possible implementation, the insulation support bracket further includes a first insulation side plate, the first insulation side plate is located on a side that is of the first insulation support plate and that faces the reflector, the first insulation side plate and the phase-shifting strip line are disposed side by side, both the first insulation side plate and the phase-shifting strip line extend in a second direction, and the second direction intersects with the first direction.

In an implementation, the first insulation side plate is located on a side that is of the first sliding dielectric plate and that is away from the insulation support bracket body. The first insulation side plate is configured to provide guidance for the first sliding dielectric plate, so that the first sliding dielectric plate can slide only in the second direction. The phase-shifting strip line and the first sliding dielectric plate are disposed side by side with the first insulation side plate, and the first sliding dielectric plate, the first insulation side plate, and the phase-shifting strip line extend in the second direction. In other words, the phase-shifting strip line and the first sliding dielectric plate are located on a same side of the first insulation side plate in a third direction, and any two of the third direction, the second direction, and the first direction intersect. For example, any two of the third direction, the second direction, and the first direction vertically intersect. The first direction is a thickness direction of the antenna. When the second direction is a width direction of the antenna, the third direction is a length direction of the antenna; or when the second direction is a length direction of the antenna, the third direction is a width direction of the antenna.

In a possible implementation, a surface that is of the first sliding dielectric plate and that faces the phase-shifting strip line is further provided with an accommodation groove, and the phase-shifting strip line is at least partially located in the accommodation groove.

In a possible implementation, the first sliding dielectric plate is provided with a first hole that penetrates the first sliding dielectric plate, the first hole extends in the second direction, a plurality of first pins arranged in the second direction are disposed on a surface that is of the first insulation support plate and that faces the reflector, the first pin passes through the first hole and can slide relative to the first hole, and the second direction intersects with the first direction and is the same as an extension direction of the first sliding dielectric plate. The plurality of first pins arranged in the second direction pass through the first hole. When the first sliding dielectric plate slides, the first sliding dielectric plate can slide only in the second direction. In other words, the first hole cooperates with the first pin, to guide the first sliding dielectric plate to slide in the second direction. This avoids deviation of the first sliding dielectric plate in a direction other than the second direction, ensures sliding control precision of the first sliding dielectric plate, and further improves phase-shifting precision of a phase shifter.

In an implementation, the first hole is a long hole extending in the second direction, and the plurality of first pins arranged in the second direction may pass through the same first hole. When there are a plurality of first holes, the plurality of first holes are arranged in the second direction. One or more first pins may be disposed in each of the plurality of first holes.

In a possible implementation, the first pin is disposed on the first sliding dielectric plate, and the first hole is provided on the first insulation support plate. The first hole cooperates with the first pin, to guide the first sliding dielectric plate to slide in the second direction.

In a possible implementation, the first sliding dielectric plate is provided with a second hole that penetrates the first sliding dielectric plate, the second hole extends in the second direction, a plurality of second pins arranged in the second direction are disposed on a surface that is of the reflector and that faces the first sliding dielectric plate, the second pin passes through the second hole and can slide relative to the second hole, and the second direction intersects with the first direction and is the same as the extension direction of the first sliding dielectric plate. The second hole cooperates with the second pin, to guide the first sliding dielectric plate to slide in the second direction.

In a possible implementation, the second pin is disposed on the first sliding dielectric plate, and the reflector is provided with the second hole. The second hole cooperates with the second pin, to guide the first sliding dielectric plate to slide in the second direction.

In a possible implementation, the first sliding dielectric plate is provided with the first hole and the second hole. The first hole and the second hole respectively cooperate with the first pin on the first insulation support plate and the second pin on the reflector, to guide the first sliding dielectric plate to slide in the second direction.

In a possible implementation, a surface that is of the first sliding dielectric plate and that faces the reflector is provided with a first groove, a first protrusion portion is disposed on the surface that is of the reflector and that faces the first sliding dielectric plate, the first groove and the first sliding dielectric plate extend in the same direction, and the first protrusion portion is located in the first groove and can slide relative to the first groove.

In a possible implementation, a second protrusion portion is disposed on a surface that is of the first sliding dielectric plate and that faces the reflector, the surface that is of the reflector and that faces the first sliding dielectric plate is provided with a second groove, the second groove and the first sliding dielectric plate extend in the same direction, and the second protrusion portion is located in the second groove. The second protrusion portion cooperates with the second groove, to guide the first sliding dielectric plate to slide in the second direction relative to the phase-shifting strip line. An extension direction of the second protrusion portion is the same as that of the second groove and the first sliding dielectric plate, and is the second direction. In some implementations, when the second protrusion portion is in a pin shape, a plurality of second protrusion portions may be disposed, and the plurality of second protrusion portions are arranged in the second direction.

In a possible implementation, a protrusion portion may be further disposed on a surface that is of the first insulation support plate and that faces the first sliding dielectric plate, and a surface that is of the first sliding dielectric plate and that faces the first insulation support plate may be further provided with a groove. The groove cooperates with the protrusion portion, to guide the first sliding dielectric plate to slide in the second direction relative to the phase-shifting strip line.

In a possible implementation, a surface that is of the first insulation support plate and that faces the first sliding dielectric plate may be further provided with a groove, and a protrusion portion may be further disposed on a surface that is of the first sliding dielectric plate and that faces the first insulation support plate. The groove cooperates with the protrusion portion, to guide the first sliding dielectric plate to slide in the second direction relative to the phase-shifting strip line.

In a possible implementation, a groove may be further provided and a first pin may be further disposed on the first insulation support plate, and a protrusion portion may be further disposed and a first hole may be further provided on the first sliding dielectric plate. The groove and the first pin respectively cooperate with the protrusion portion and the first hole, to guide the first sliding dielectric plate to slide.

In a possible implementation, the antenna further includes a second sliding dielectric plate, and the second sliding dielectric plate is located between the first insulation support plate and the phase-shifting strip line. That the first insulation support plate, the phase-shifting strip line, the first sliding dielectric plate, and the reflector are sequentially disposed in a first direction is:

The first insulation support plate, the second sliding dielectric plate, the phase-shifting strip line, the first sliding dielectric plate, and the reflector are sequentially disposed in the first direction. The second sliding dielectric plate is connected to the first sliding dielectric plate, and a phase shifter of the feed network includes the first insulation support plate, the second sliding dielectric plate, the phase-shifting strip line, the first sliding dielectric plate, and the reflector. The second sliding dielectric plate and the first sliding dielectric plate simultaneously slide relative to the phase-shifting strip line, and jointly affect a phase of a signal in the phase-shifting strip line.

In a possible implementation, a surface that is of the second sliding dielectric plate and that is away from the phase-shifting strip line is provided with a third groove, and a surface that is of the first insulation support plate and that faces the second sliding dielectric plate is a plane. The third groove is configured to reduce a contact area between the first insulation support plate and the second sliding dielectric plate, to reduce friction, so that the second sliding dielectric plate slides more easily.

In a possible implementation, the insulation support bracket further includes a first insulation side plate, the first insulation side plate is located on a side that is of the first insulation support plate and that faces the reflector, the first insulation side plate and the phase-shifting strip line are disposed side by side, both the first insulation side plate and the phase-shifting strip line extend in a second direction, and the second direction intersects with the first direction. The phase-shifting strip line and the second sliding dielectric plate are disposed side by side with the first insulation side plate in a third direction. In other words, the phase-shifting strip line and the second sliding dielectric plate are located on a same side of the first insulation side plate in the third direction.

In a possible implementation, the insulation support bracket further includes an insulation support bracket body, the first insulation support plate and the insulation support bracket body are disposed side by side in a third direction, the first insulation side plate is located at an end that is of the first insulation support plate and that is close to the insulation support bracket body, and the second sliding dielectric plate is located on a side that is of the first insulation side plate and that is away from the insulation support bracket body. The first insulation side plate may provide guidance for the second sliding dielectric plate to slide, so that the second sliding dielectric plate can slide only in the second direction. This avoids deviation of the second sliding dielectric plate in a direction other than the second direction, ensures sliding control precision of the second sliding dielectric plate, and further improves phase-shifting precision of a phase shifter.

In a possible implementation, the insulation support bracket includes two first insulation side plates, the two first insulation side plates are oppositely disposed at two ends of the first insulation support plate in the third direction, and both the two first insulation side plates extend in the second direction. The two first insulation side plates provide guidance for the second sliding dielectric plate to slide, so that the second sliding dielectric plate can slide only in the second direction. This avoids deviation of the second sliding dielectric plate in a direction other than the second direction, ensures sliding control precision of the second sliding dielectric plate, and further improves phase-shifting precision of a phase shifter.

In a possible implementation, a surface that is of the second sliding dielectric plate and that faces the first insulation support plate is provided with a third groove, a third protrusion portion is disposed on a surface that is of the first insulation support plate and that faces the second sliding dielectric plate, the third groove and the second sliding dielectric plate extend in a same direction, and the third protrusion portion is located in the third groove and can slide relative to the third groove. The extension direction of the third groove and the second sliding dielectric plate is the second direction. The third groove cooperates with the third protrusion portion, so that the second sliding dielectric plate can slide only in the second direction. This avoids deviation of the second sliding dielectric plate in a direction other than the second direction, ensures sliding control precision of the second sliding dielectric plate, and further improves phase-shifting precision of a phase shifter.

In a possible implementation, a fourth protrusion portion is disposed on a surface that is of the second sliding dielectric plate and that is away from the phase-shifting strip line, a surface that is of the first insulation support plate and that faces the second sliding dielectric plate is provided with a fourth groove, the fourth groove and the second sliding dielectric plate extend in a same direction, and the fourth protrusion portion is located in the fourth groove and can slide relative to the fourth groove. The extension direction of the fourth groove and the second sliding dielectric plate is the second direction. The fourth protrusion portion cooperates with the fourth groove, so that the second sliding dielectric plate can slide only in the second direction. This avoids deviation of the second sliding dielectric plate in a direction other than the second direction, ensures sliding control precision of the second sliding dielectric plate, and further improves phase-shifting precision of a phase shifter.

In a possible implementation, the second sliding dielectric plate is provided with a long hole, and a pin is disposed on a surface that is of the first insulation support plate and that faces the second sliding dielectric plate. Alternatively, a pin is disposed on a surface that is of the second sliding dielectric plate and that faces the first insulation support plate, and the first insulation support plate is provided with a long hole. The pin cooperates with the long hole, to guide the second sliding dielectric plate to slide.

In a possible implementation, a pin and a long hole on the second sliding dielectric plate and the first insulation support plate cooperate with each other, and a long hole and a pin on the first sliding dielectric plate and the reflector cooperate with each other, to jointly guide the first sliding dielectric plate and the second sliding dielectric plate to slide.

In a possible implementation, a protrusion portion and a groove on the second sliding dielectric plate and the first insulation support plate cooperate with each other, and a protrusion portion and a groove on the first sliding dielectric plate and the reflector cooperate with each other, to jointly guide the first sliding dielectric plate and the second sliding dielectric plate to slide.

In a possible implementation, the reflector includes a reflector body and a reflective side plate, and the reflective side plate is located at an edge of the reflector body, and is connected to and intersects with the reflector body. The insulation support bracket further includes a second insulation side plate. The second insulation side plate is located at an end that is of the first insulation support plate and that is away from the insulation support bracket body. One end of the second insulation side plate is connected to and intersects with the first insulation support plate, and the other end of the second insulation side plate is disposed away from the reflector. Cross-sections of the second insulation side plate and the first insulation support plate are in an "L" shape. The feed network further includes the first side phase-shifting strip line and the third sliding dielectric plate. The first side phase-shifting strip line is connected to the phase-shifting strip line, and the third sliding dielectric plate is connected to the first sliding dielectric plate. Cross-sections of the third sliding dielectric plate and the first sliding dielectric plate are in an "L" shape. The reflective side plate, the third sliding dielectric plate, the first side phase-shifting strip line, and the second insulation side plate are sequentially adjacent in the third direction. The third sliding dielectric plate may slide in the second direction relative to the first side phase-shifting strip line. The third sliding dielectric plate slides relative to the first side phase-shifting strip line, to change a phase of a signal in the first side phase-shifting strip line. The reflective side plate, the third sliding dielectric plate, the first side phase-shifting strip line, and the second insulation side plate form a phase shifter. A reference ground of the phase shifter is only the reflective side plate, in other words, the reflective side plate is a single-side reference ground of the phase shifter.

In a possible implementation, the antenna further includes a radiating element, the radiating element is fastened on a side that is of the insulation support bracket and that is away from the reflector, and the reflector, the feed network, the insulation support bracket, and the radiating element are sequentially disposed in the first direction.

In a possible implementation, the phase-shifting strip line and the insulation support bracket are of an integrated structure. A size of the phase shifter is reduced, and a structure is simpler.

In a possible implementation, the phase-shifting strip line is located on the surface that is of the first insulation support plate and that faces the reflector, and a phase shifter of the feed network includes the first insulation support plate, the phase-shifting strip line, the first sliding dielectric plate, and the reflector. In this embodiment, a reference ground of the phase shifter is also a single-side reference ground.

In a possible implementation, the insulation support bracket and a circuit part, other than the first sliding dielectric plate, in the feed network are of an integrated structure. A size of the antenna may be greatly reduced, and a structure is simpler. In an implementation, the insulation support bracket and the circuit part, other than the first sliding dielectric plate, in the feed network may be formed through integrated injection molding, or the feed network is formed by electroplating a metal on the insulation support bracket with reference to an etching pattern process.

In a possible implementation, the insulation support bracket further includes a second insulation support plate, the second insulation support plate is connected to and intersects with the first insulation support plate, the second insulation support plate is located on a side that is of the first insulation support plate and that is away from the reflector, and a part, other than the phase-shifting strip line, in the feed network is located on the second insulation support plate.

In a possible implementation, the antenna is a dual-polarized antenna, and the dual-polarized antenna includes a first antenna structure and a second antenna structure that are adjacent. A feed network in the first antenna structure is a positive-polarized feed network, and a feed network in the second antenna structure is a negative-polarized feed network. Insulation support brackets in the first antenna structure and the second antenna structure are respectively a first insulation support bracket and a second insulation support bracket. A ground plate is disposed between the first insulation support bracket and the second insulation support bracket.

In a possible implementation, the first antenna structure and the second antenna structure further respectively include a positive-polarized radiating sub-element and a negative-polarized radiating sub-element. The positive-polarized radiating sub-element is connected to the positive-polarized feed network, the negative-polarized radiating sub-element is connected to the negative-polarized feed network, and the positive-polarized radiating sub-element and the negative-polarized radiating sub-element are respectively fastened to an end of the first insulation support bracket and an end of the second insulation support bracket that are away from the reflector. An end that is of the ground plate and that is away from the reflector extends between the positive-polarized radiating sub-element and the negative-polarized radiating sub-element, so that the ground plate is used as a reference ground of the positive-polarized radiating sub-element and the negative-polarized radiating sub-element.

In a possible implementation, first sliding dielectric plates in the first antenna structure and the second antenna structure that are adjacent are fastened. The two first sliding dielectric plates may be fastened by using a fastener, so that the two first sliding dielectric plates can be simultaneously driven by a transmission mechanism. The fastener may be of a flower structure, or may be in another shape. This may be set based on an actual requirement. A manner of fastening and connecting the two adjacent first sliding dielectric plates further includes welding, clamping, using a rivet, using a screw, hot riveting, or the like.

In a possible implementation, the antenna includes a dual-polarized antenna array, each dual-polarized antenna includes the first antenna structure and the second antenna structure, and a plurality of dual-polarized antennas are arranged in the third direction.

In a possible implementation, the antenna further includes a fourth sliding dielectric plate, the feed network further includes a second side phase-shifting strip line, the second side phase-shifting strip line is located on a side that is of the second insulation support plate and that faces the ground plate, and the fourth sliding dielectric plate is located between the second side phase-shifting strip line and the ground plate. The fourth sliding dielectric plate and the first sliding dielectric plate jointly affect a phase of a signal. Another phase shifter in the antenna includes the second insulation support plate, the second side phase-shifting strip line, the fourth sliding dielectric plate, and the ground plate.

In a possible implementation, a second sliding dielectric plate may be further disposed between the phase-shifting strip line and the reflector, and the first sliding dielectric plate and the second sliding dielectric plate jointly affect a phase of a signal in the phase-shifting strip line.

In an embodiment, the reflector includes a reflector body and a reflective side plate. The reflective side plate is located at an edge of the reflector body, and is connected to and intersects with the reflector body. The insulation support bracket, the feed network, and the radiating element are located on a side of the reflector body in a fourth direction. The first insulation support plate, the phase-shifting strip line, the first sliding dielectric plate, and the reflective side plate are sequentially disposed in the first direction. The first direction is parallel to the reflector body, and the first direction vertically intersects with the fourth direction. The phase shifter of the feed network includes the first insulation support plate, the phase-shifting strip line, the first sliding dielectric plate, and the reflective side plate. A reference ground of the phase shifter is a single-side reference ground.

In a possible implementation, a protrusion portion may be disposed and a groove may be provided on, or a long hole may be provided and a pin may be disposed on the reflective side plate and the first sliding dielectric plate. The protrusion portion cooperates with the groove, or the long hole cooperates with the pin, to guide the first sliding dielectric plate to slide. Details are not described herein again. Refer to the foregoing descriptions to understand a cooperation function of the protrusion portion and the groove, and a cooperation function of the long hole and the pin.

According to a second aspect, this disclosure provides a base station. The base station includes a radio frequency processing unit and the antenna according to any one of the foregoing implementations, and the radio frequency processing unit is electrically connected to the antenna. An antenna that is more miniaturized and lightweight can reduce a size of the base station, so that the base station is more miniaturized.

In the antenna in this disclosure, in an aspect, a reflector is used as a reference ground of a phase shifter, and no additional metal plate or metal cavity is required as the reference ground of the phase shifter, so that a structure of the antenna can be simplified and costs can be reduced. In another aspect, the reference ground of the phase shifter in this disclosure is a single-side reference ground, and a first insulation support plate is on another side of a phase-shifting strip line. Compared with a phase shifter that is in a metal cavity shape and whose reference ground is a double-side reference ground, a material of the first insulation support plate is lighter, and can make the antenna be more lightweight. In still another aspect, the first insulation support plate in an insulation support bracket configured to fasten a feed network may be configured to limit a position of a first sliding dielectric plate, to ensure stability of the phase shifter, further improve integration of the antenna, and implement miniaturization of the antenna. A protrusion portion may be disposed and a groove may be provided on, or a long hole may be provided and a pin may be disposed on the first sliding dielectric plate, the first insulation support plate, and the reflector, to implement a guiding function. A protrusion portion may be disposed and a groove may be provided on, or a long hole may be provided and a pin may be disposed on a second sliding dielectric plate and the first insulation support plate, to implement a guiding function. The phase-shifting strip line and the insulation support bracket are integrally formed, to further simplify the structure of the antenna, and make the antenna be more miniaturized and lightweight.

BRIEF DESCRIPTION OF DRAWINGS

To describe technical solutions in embodiments of this disclosure more clearly, the following describes the accompanying drawings used in embodiments of this disclosure.

REFERENCE NUMERALS

Figure 1:
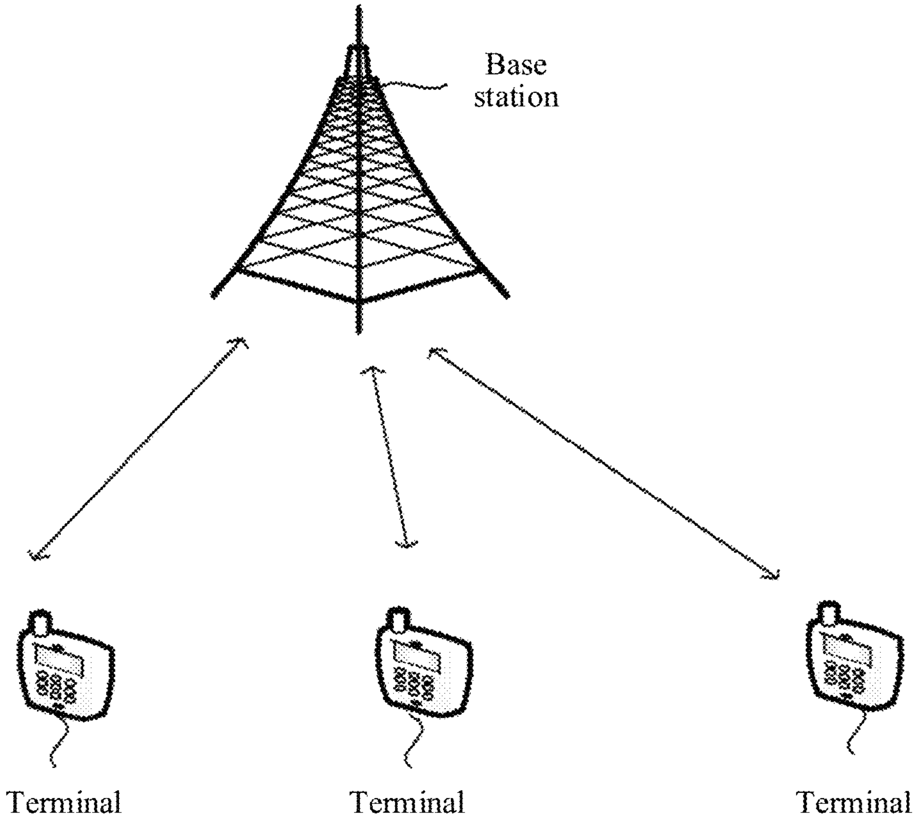
FIG. 1 is a diagram of a system architecture to which an embodiment of this disclosure is applicable.

- 1—Antenna; 10—Antenna structure; 100—Reflector;
- 101—Second pin; 102—First protrusion portion; 103—Second groove;
- 11—Radome; 110—Ground plate; 120—Reflector body;
- 130—Reflective side plate; 2—Pole; 20—First antenna structure;
- 200—Insulation support bracket; 200*a*—First insulation support bracket; 200*b*—Second insulation support bracket;
- 201—Accommodation space; 211—First pin; 212—Third protrusion portion;
- 213—Fourth groove; 214—Second insulation side plate; 215—Third insulation side plate;
- 216—Fourth insulation side plate; 230—Insulation support bracket body; 240—Fastener;
- 241—Fastening plug-in; 242—Fastening pad; 3—Antenna adjustment support bracket;
- 30—Second antenna structure; 300—Feed network; 300*a*—Positive-polarized feed network;
- 300*b*—Negative-polarized feed network; 301—Power divider; 302—Filter;
- 311—First side phase-shifting strip line; 312—Second side phase-shifting strip line; 321—First hole;
- 322—Second hole; 323—First groove; 324—Second protrusion portion;
- 325—Fastener; 331—Metal cavity; 332—Sliding medium;
- 360—Feed structure; 370—Third sliding dielectric plate; 380*a*—First circuit part;
- 380*b*—Second circuit part; 390—Fourth sliding dielectric plate; 400—Transmission mechanism;
- 5—Radio frequency processing unit; 500—Radiating element; 501—Balun;
- 502—Dipole arm; 503—Director; 510—Positive-polarized radiating sub-element;
- 520—Negative-polarized radiating sub-element; 6—Baseband processing unit;
- 210, 210*a*, 210*b*, 210*c*, and 210*d*—First insulation support plates;
- 220, 220*a*, 220*b*, 220*c*, and 220*d*—First insulation side plates;
- 250, 250*a*, and 250*b*—Second insulation support plates;
- 310, 310*a*, and 310*b*—Phase-shifting strip lines;
- 320, 320*a*, 320*b*, 320*c*, and 320*d*—First sliding dielectric plates;
- 330, 330*a*, 330*b*, 330*c*, and 330*d*—Phase shifters;
- 340, 340*c*, and 340*d*—Second sliding dielectric plates; and
- 350*a* and 350*b*—Signal transmission ports.

DESCRIPTION OF EMBODIMENTS

The following describes the technical solutions in embodiments of this disclosure with reference to the accompanying drawings in embodiments of this disclosure. It is clear that the described embodiments are merely a part rather than all of embodiments of this disclosure.

Terms "first", "second", and the like in this specification are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this disclosure, unless otherwise stated, "a plurality of" means two or more than two.

In addition, in this specification, orientation terms such as "upper" and "lower" are defined relative to orientations of schematically disposed structures in the accompanying drawings. It should be understood that these directional terms are relative concepts and are used for relative description and clarification, and may vary accordingly with changes of the orientations of the structures.

A solid circle in a direction coordinate graph in the accompanying drawings of the specification represents a direction Y perpendicular to an X-Z plane.

For ease of understanding of an antenna and a base station provided in embodiments of this disclosure, the following describes an application scenario of the antenna and the base station. FIG. 1 shows an example. As shown in FIG. 1, the application scenario may include a base station and a terminal. Wireless communication may be implemented between the base station and the terminal. The base station may be located in a base station subsystem (BSS), a terrestrial radio access network (UTRAN), or an evolved universal terrestrial radio access network (E-UTRAN), and is configured to perform cell coverage of a radio signal, to implement communication between the terminal device and a wireless network. Specifically, the base station may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB) in a long term evolution (LTE) system, or may be a radio controller in a cloud radio access network (CRAN) scenario. Alternatively, the base station may be a relay station, an access point, a vehicle-mounted device, a wearable device, a g node (gNodeB or gNB) in a new radio (NR) system, a base station in a future evolved network, or the like. This is not limited in embodiments of this disclosure.

Figure 2:
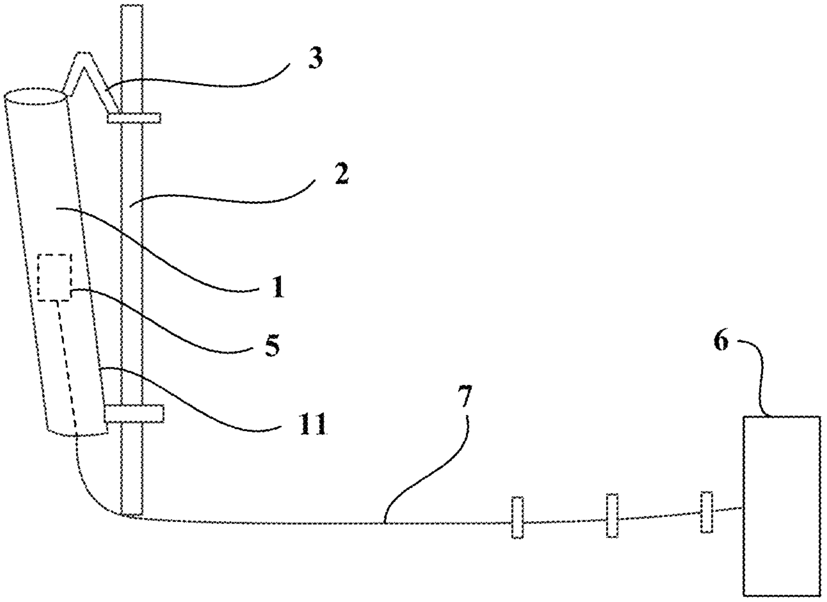
FIG. 2 is a diagram of a structure of a base station antenna system according to an embodiment of this disclosure.

FIG. 2 is a diagram of a possible structure of a base station. The base station may generally include structures such as an antenna 1, a pole 2, and an antenna adjustment support bracket 3. The antenna 1 of the base station includes a radome 11. The radome 11 has a good electromagnetic wave penetration characteristic in terms of electrical performance, and can withstand impact of an external harsh environment in terms of mechanical performance, so that the radome 11 can protect an antenna system from being affected by an external environment. The antenna 1 may be installed on the pole 2 or a tower by using the antenna adjustment support bracket 3, to facilitate signal receiving or transmitting of the antenna 1.

In addition, the base station may further include a radio frequency processing unit 5 and a baseband processing unit 6. For example, the radio frequency processing unit 5 may be configured to: perform frequency selection, amplification, and down-conversion processing on a signal received by the antenna 1, convert the signal into an intermediate frequency signal or a baseband signal, and send the intermediate frequency signal or the baseband signal to the baseband processing unit 6. Alternatively, the radio frequency processing unit 5 is configured to: perform up-conversion and amplification processing on a baseband signal or an intermediate frequency signal, convert the baseband processing unit or the intermediate frequency signal into an electromagnetic wave by using the antenna 1, and send the electromagnetic wave by using the antenna 1. The baseband processing unit 6 may be connected to a feed network of the antenna 1 by using the radio frequency processing unit 5. In some implementations, the radio frequency processing unit 5 may also be referred to as a remote radio unit (RRU), and the baseband processing unit 6 may also be referred to as a baseband unit (BBU). In a possible embodiment, as shown in FIG. 2, the radio frequency processing unit 5 and the antenna 1 may be integrally disposed, and the baseband processing unit 6 is located at a remote end of the antenna 1. In some other embodiments, both the radio frequency processing unit 5 and the baseband processing unit 6 may be located at a remote end of the antenna 1. The radio frequency processing unit 5 and the baseband processing unit 6 may be connected through a cable 7.

Figure 3:
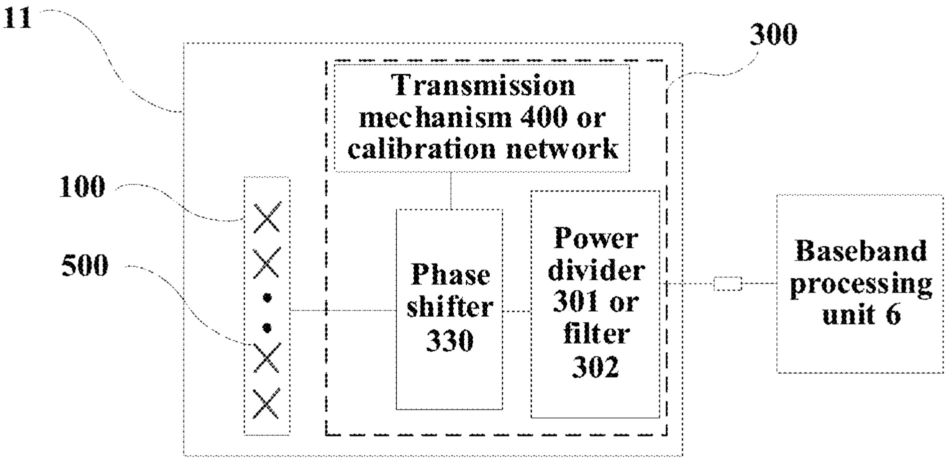
FIG. 3 is a composition schematic of an antenna according to an embodiment of this disclosure.

More specifically, FIG. 3 is a composition schematic of an antenna according to a possible embodiment of this disclosure. As shown in FIG. 3, the antenna 1 of a base station may include a radiating element 500 and a reflector 100. It should be noted that the radiating element herein generally means all radiating elements, for example, may include a positive-polarized radiating sub-element 510 and a negative-polarized radiating sub-element 520 in the following embodiments. The radiating element 500 may also be referred to as an antenna element, an element, or the like. The radiating element 500 is an element that forms a basic structure of an antenna array, and can effectively send or receive an antenna signal. In the antenna 1, frequencies of different radiating elements 500 may be the same or different. The reflector 100 may also be referred to as a bottom plate, an antenna panel, a reflective surface, or the like, and may be made of a metal material. When the antenna receives a signal, the reflector 100 may reflect and aggregate the antenna signal on a reception point, to implement directional reception. When the antenna transmits a signal, the reflector 100 implements directional transmission of the antenna signal. The radiating element 500 is usually placed on a surface of a side of the reflector 100. This can not only greatly enhance a signal receiving or transmitting capability of the antenna 1, but also block and shield interference of another electromagnetic wave that is from a back side of the reflector 100 (in this disclosure, the back side of the reflector 100 is a side that is opposite to the side that is of the reflector 100 and on which the radiating element 500 is disposed) on reception of the antenna signal, to improve a gain of the antenna.

In the antenna 1 of the base station, the radiating element 500 is connected to a feed network 300. The feed network 300 is generally formed by a controlled impedance transmission line. The feed network 300 may feed a signal to the radiating element 500 based on a specific amplitude and phase, or send a received signal to a baseband processing unit 6 of the base station based on a specific amplitude and phase. Specifically, in some implementations, the feed network 300 may implement beam radiation in different directions by using a transmission mechanism 400, or may be connected to the transmission mechanism 400 to obtain a calibration signal required by a system. The feed network 300 may include a phase shifter 330, configured to change a direction with maximum radiant intensity of the antenna signal. Some modules for performance extension may be further disposed in the feed network 300, for example, a power divider 301. The power divider 301 may be configured to: combine a plurality of channels of signals into one channel of signal and transmit the signal through the antenna 1. Alternatively, the power divider 301 divides one channel of signal into a plurality of channels of signals, for example, divides, based on different frequencies, a signal received by the antenna 1 into a plurality of channels of signals, and transmits the signals to the baseband processing unit 6 for processing. For another example, a filter 302 may be further disposed in the feed network 300 to filter out an interference signal.

Figure 4:
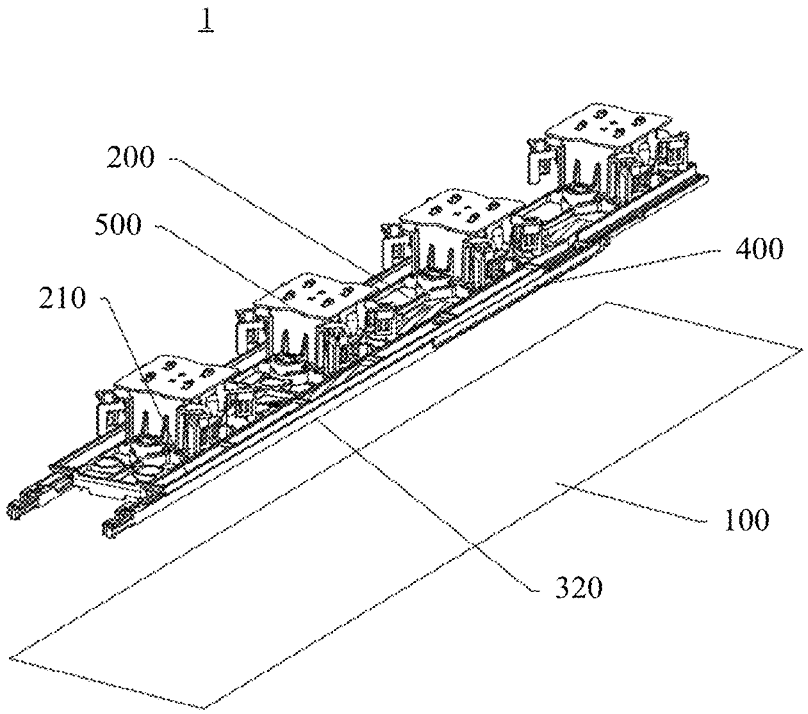
FIG. 4 is a diagram of a structure of an antenna according to an embodiment of this disclosure.
Figure 5:
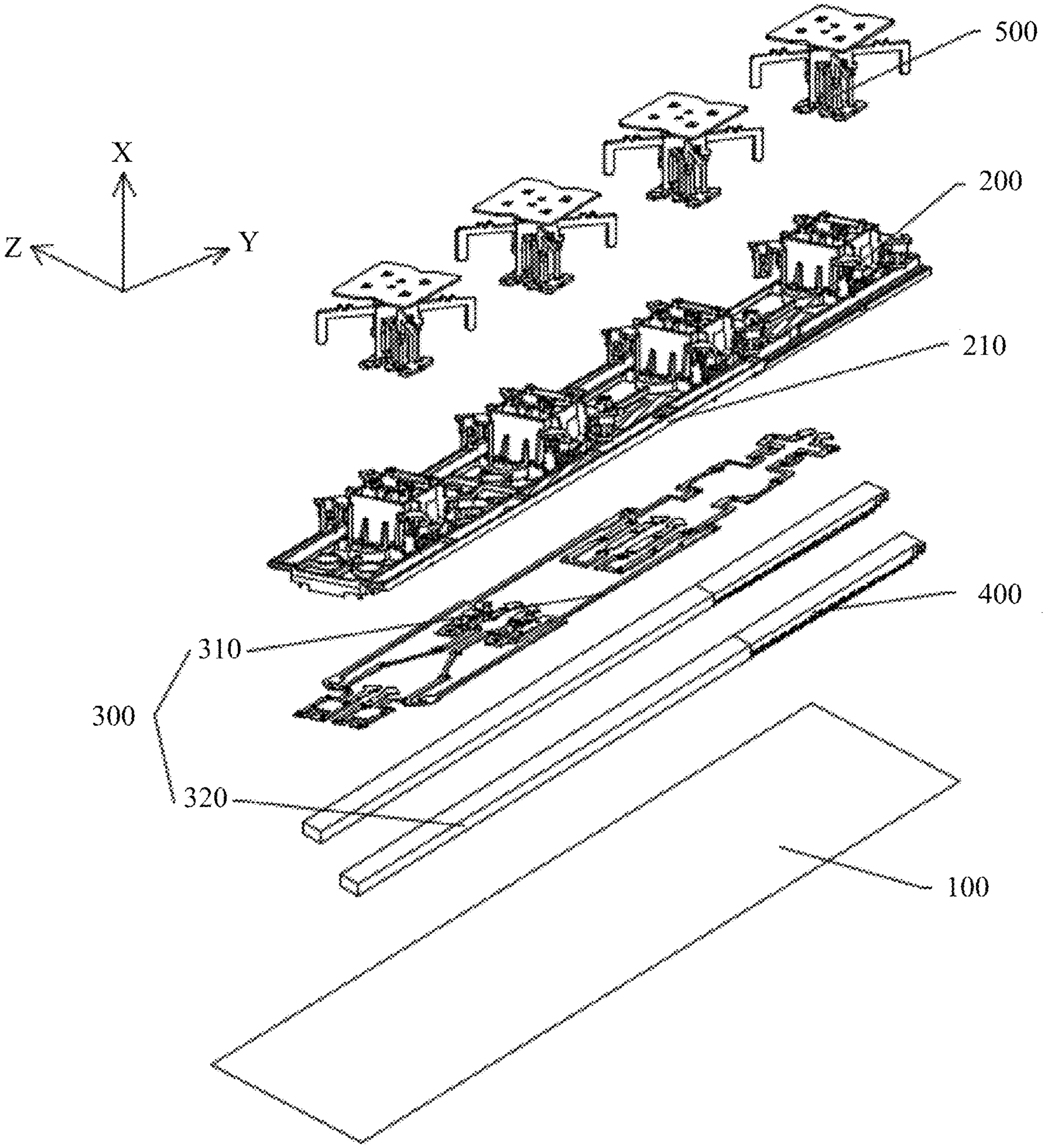
FIG. 5 is an exploded view of an antenna according to an embodiment of this disclosure.
Figure 6:
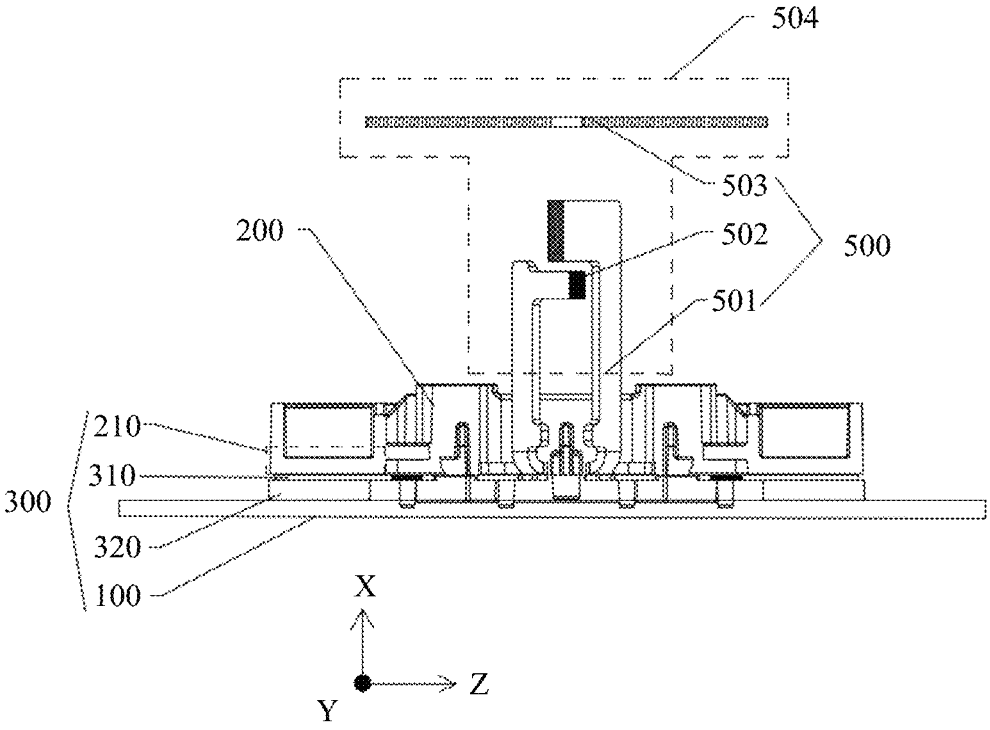
FIG. 6 is a side view of an antenna according to an embodiment of this disclosure.
Figure 7:
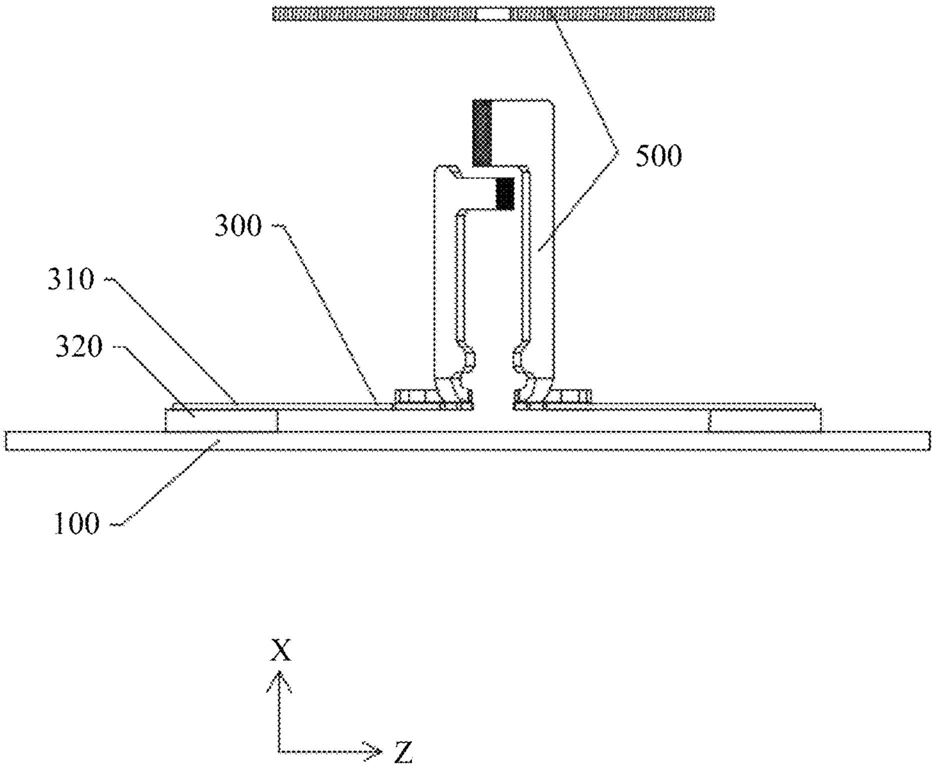
FIG. 7 is a side view of an antenna without an insulation support bracket according to an embodiment of this disclosure.

FIG. 4 is a diagram of a structure of an antenna 1 according to an embodiment of this disclosure. FIG. 5 is a three-dimensional exploded view of the antenna 1 in FIG. 4. FIG. 6 is a side view of the antenna 1 in FIG. 4. FIG. 7 is a side view of the antenna 1 without an insulation support bracket 200 based on FIG. 6. This embodiment of this disclosure provides the antenna 1, including a reflector 100, the insulation support bracket 200, and a feed network 300. The insulation support bracket 200 is located on a side of the reflector 100. The insulation support bracket 200 includes a first insulation support plate 210. The feed network 300 and the insulation support bracket 200 are located on the same side of the reflector 100, the feed network 300 is connected to the insulation support bracket 200, and the feed network 300 includes a phase-shifting strip line 310 and a first sliding dielectric plate 320. The first insulation support plate 210, the phase-shifting strip line 310, the first sliding dielectric plate 320, and the reflector 100 are sequentially disposed in a first direction X.

In an implementation, the first direction X is a direction perpendicular to an overall plate surface of the reflector 100, and the feed network 300 and the insulation support bracket 200 are located on the same side of the reflector 100 in the first direction X. The insulation support bracket 200 is made of an insulating material, for example, plastic, and has little interference on a signal or electrical performance of the feed network 300. In some cases, it may be considered that the insulation support bracket 200 compared with a support bracket made of a metal material does not affect electrical performance of the feed network 300. A shape of the insulation support bracket 200 may be set based on a shape of the feed network 300, so that the feed network 300 can be stably fastened to the insulation support bracket 200. A fastening manner includes but is not limited to welding, clamping, using a rivet, using a screw, or hot riveting. In some implementations, the feed network 300 and the insulation support bracket 200 may be stacked on the same side of the reflector 100 in the first direction X. In this way, a size of the antenna 1 can be reduced. In an implementation, the insulation support bracket 200 may be fastened on the reflector 100, to fasten the feed network 300 between the insulation support bracket 200 and the reflector 100. A manner of fastening the insulation support bracket 200 and the reflector 100 includes but is not limited to welding, clamping, using a rivet, using a screw, or hot riveting.

A power divider, a filter, a multiplexer, or another functional module may be disposed in a circuit in the feed network 300 based on an actual requirement. The feed network 300 may be implemented in a form of a PCB board (Printed Circuit Board, printed circuit board), a metal strip line, or the like. The first sliding dielectric plate 320 has a specific dielectric constant, and the dielectric constant may be selected based on an actual requirement.

Refer to FIG. 6 again. The first insulation support plate 210, the phase-shifting strip line 310, the first sliding dielectric plate 320, and the reflector 100 are sequentially adjacent in the first direction X. There is no other component between the first insulation support plate 210 and the phase-shifting strip line 310, between the phase-shifting strip line 310 and the first sliding dielectric plate 320, or between the first sliding dielectric plate 320 and the reflector 100. There is no ground plane, reflector, metal plate, or other metal material between the first insulation support plate 210 and the phase-shifting strip line 310. In this embodiment, a structure of a phase shifter 330 may be simplified, and correspondingly a structure of the antenna 1 is also simplified.

Refer to FIG. 6 again. In this embodiment, the phase-shifting strip line 310 may be used as an inner conductor of the phase shifter 330, and the reflector 100 may be used as an outer conductor of the phase shifter 330, that is, a reference ground of a signal in the phase-shifting strip line 310. The first sliding dielectric plate 320 is located between the phase-shifting strip line 310 (the inner conductor of the phase shifter 330) and the reflector 100 (the outer conductor of the phase shifter 330). The first sliding dielectric plate 320 moves, to change a relative position between the first sliding dielectric plate 320 and the phase-shifting strip line 310, and further change a dielectric constant between the phase-shifting strip line 310 and the reflector 100. In this way, a phase of the signal in the phase-shifting strip line 310 changes, so that a beam on a vertical plane of the antenna 1 forms specific downtilt. The feed network 300 may drive, by using a transmission mechanism 400 (as shown in FIG. 5), the first sliding dielectric plate 320 to move, to implement beam radiation in different directions.

Figure 8:
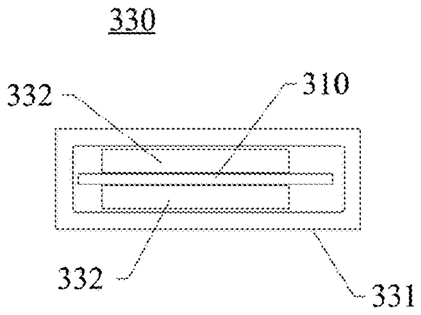
FIG. 8 is a diagram of a structure of a phase shifter in a conventional technology.

In this embodiment, it should be noted that there is no other component between the first insulation support plate 210 and the phase-shifting strip line 310. A reference ground of the phase shifter 330 is only the reflector 100 located on one side of the phase-shifting strip line 310. The first insulation support plate 210 on the other side of the phase-shifting strip line 310 is not used as the reference ground because the first insulation support plate 210 is made of an insulating material. That is, the reference ground of the phase shifter 330 is a single-side reference ground. Refer to FIG. 8. In a conventional technology, a phase shifter 330 uses a metal cavity 331 as a reference ground of a phase-shifting strip line 310. Both the upper and lower sides of the phase-shifting strip line 310 are metal plates, and sliding media 332 exist on the two sides of the phase-shifting strip line 310. The phase-shifting strip line 310 and the sliding media 332 are accommodated in the metal cavity 331. In other words, in the conventional technology, the reference ground of the phase-shifting strip line 310 is a double-side reference ground. To be specific, the double-side reference ground is the metal plates located on the upper and lower sides of the phase-shifting strip line 310. However, in this embodiment (as shown in FIG. 6), the phase shifter 330 of the feed network 300 includes the first insulation support plate 210, the phase-shifting strip line 310, the first sliding dielectric plate 320, and the reflector 100. To be specific, in the phase shifter 330, the first insulation support plate 210 is on one side of the phase-shifting strip line 310, and the reflector 100 is on the other side. The phase shifter 330 is an open phase shifter without a cavity. A function of the reflector 100 in the antenna 1 is to reflect and aggregate an antenna signal on a reception point, to implement directional reception. In this disclosure, the reflector 100 is reused as the reference ground, and no additional component is required as the reference ground. Because the reference ground is a single-side reference ground, compared with the phase shifter shown in FIG. 8, the phase shifter 330 in this disclosure is lighter. Further, when the phase shifter shown in FIG. 8 is used in an antenna, an additional fastening support bracket is further required in the antenna to fasten a feed network. This not only reduces integration of the antenna, but also makes a structure of the antenna be complex. However, in this embodiment, a main function of the insulation support bracket 200 is to fasten the feed network 300. A part (the first insulation support plate 210) in the insulation support bracket 200 and the reflector 100 are reused to clamp on two sides of the first sliding dielectric plate 320, and no additional component is required to limit a position of the first sliding dielectric plate 320. In other words, in this embodiment, the reflector 100 is reused as the reference ground of the phase shifter 330, and the part (the first insulation support plate 210) in the insulation support bracket 200 is reused to limit the position of the first sliding dielectric plate 320. This improves integration of the antenna 1, simplifies the structure, and implements lightweight and miniaturization of the antenna 1.

In this embodiment, the phase-shifting strip line 310 and the first sliding dielectric plate 320 extend in a second direction Y. The first sliding dielectric plate 320 can slide in the second direction Y relative to the phase-shifting strip line 310. The second direction Y may vertically intersect with the first direction X. The first direction X is a thickness direction of the antenna 1, and the second direction Y is a length direction or a width direction of the antenna 1.

As described above, in an implementation, the first insulation support plate 210, the phase-shifting strip line 310, the first sliding dielectric plate 320, and the reflector 100 are sequentially adjacent and are stacked in the first direction X. A manner in which the components are sequentially adjacent and are stacked can improve structural strength of the phase shifter 330, and avoid a case in which a phase-shifting function cannot be implemented because components in the phase shifter 330 are separated when being impacted.

In this application, the phase-shifting strip line 310 may be any segment of signal cable whose signal phase needs to be changed in the feed network 300. For example, the phase-shifting strip line 310 may be a segment of signal cable in the power divider. The power divider is a functional module that divides one channel of signal into a plurality of channels of signals or combines a plurality of channels of signals into one channel of signal. When the phase-shifting strip line 310 is a segment of signal cable in the power divider, the power divider may implement both a power dividing function and a phase-shifting function. The power divider and the phase shifter may be collectively referred to as a phase-shifting power divider. For another example, the phase-shifting strip line 310 may alternatively be a segment of signal cable close to a radiating element in the feed network. In this disclosure, the phase-shifting strip line 310 may be a metal wire, may be of a strip line structure, or may be of a microstrip structure. With reference to FIG. 5 and FIG. 7, for ease of assembling the phase shifter 330, in an implementation, the phase-shifting strip line 310 is located at an edge of the feed network 300. In another implementation, the phase-shifting strip line 310 may alternatively be located in a middle position of the feed network 300.

With reference to FIG. 5 and FIG. 6, in this embodiment, the antenna 1 further includes a radiating element 500. The radiating element 500 is fastened on a side that is of the insulation support bracket 200 and that is away from the reflector 100. The reflector 100, the feed network 300, the insulation support bracket 200, and the radiating element 500 are sequentially disposed in the first direction X. In this way, the structure of the antenna 1 is simple, and the integration is high, so that the antenna 1 is more lightweight and miniaturized. The radiating element 500 includes a balun 501, a dipole arm 502, and a director 503. The director 503 is configured to change a radiation direction of a signal, and the director 503 may be fastened above the dipole arm 502 by using a support member. In some implementations, the director 503 may not be disposed. That the reflector 100, the feed network 300, the insulation support bracket 200, and the radiating element 500 are sequentially disposed is that the feed network 300 is located between the reflector 100 and the insulation support bracket 200, and the insulation support bracket 200 is located between the feed network 300 and the radiating element 500. It should be noted that the radiating element 500 herein means an upper end of the radiating element 500, for example, a part 504 in a dashed box in FIG. 6. A lower end of the radiating element 500 needs to be connected to the feed network 200 by passing through the insulation support bracket 200. In some implementations, when the radiating element 500 is coupled to the feed network 200, the entire radiating element 500 may be placed on the side that is of the insulation support bracket 200 and that is away from the reflector 100.

Figure 9:
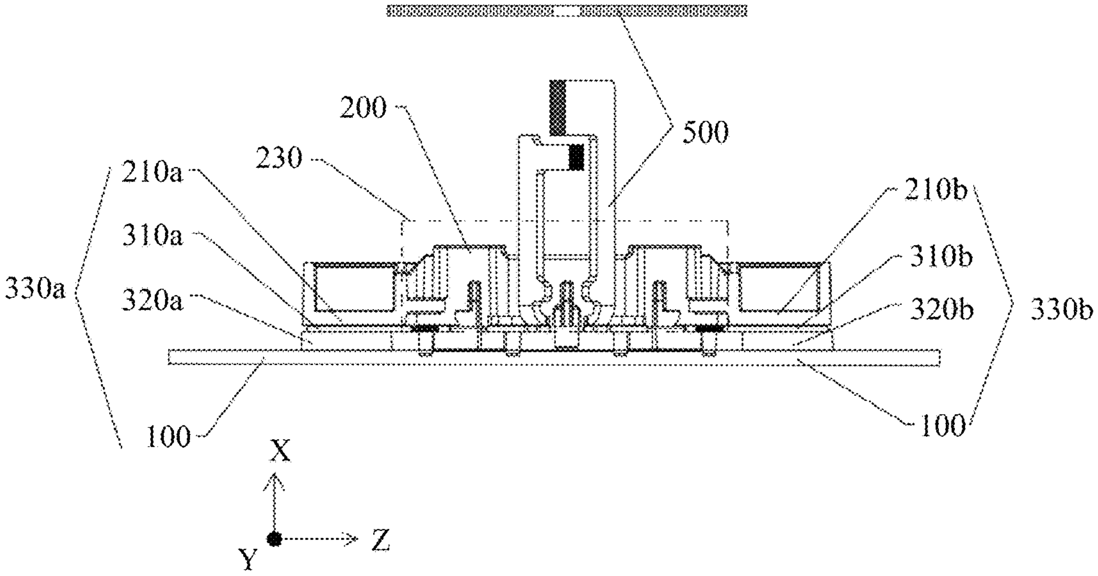
FIG. 9 is a side view of an antenna according to an embodiment of this disclosure.
Figure 10:
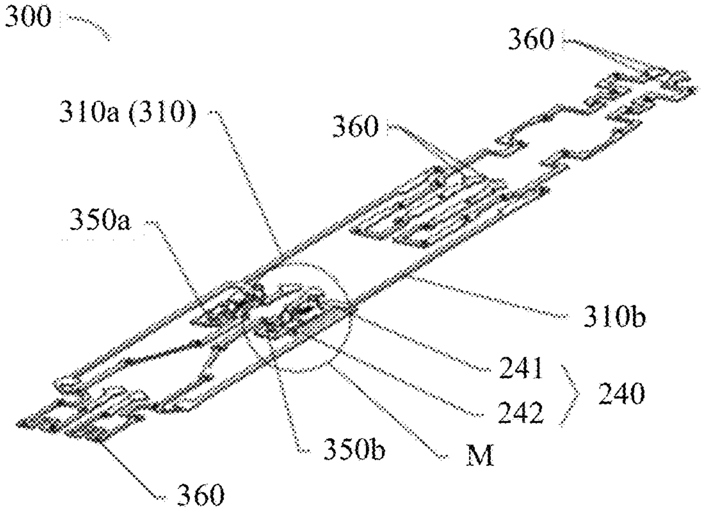
FIG. 10 is a diagram of a structure of a feed network part in an antenna according to an embodiment of this disclosure.

Refer to FIG. 9 and FIG. 10. In this embodiment, a feed network 300 includes two phase shifters 330. The two phase shifters 330 are disposed opposite to each other in a third direction Z, and are respectively denoted as a phase shifter 330*a* and a phase shifter 330*b*. Specifically, the feed network 300 is symmetrically disposed (as shown in FIG. 10), and includes two phase-shifting strip lines 310*a* and 310*b* (as shown in FIG. 10), two signal transmission ports 350*a* and 350*b* (as shown in FIG. 10), a plurality of feed structures 360 (as shown in FIG. 10), and two first sliding dielectric plates 320*a* and 320*b* (as shown in FIG. 9). The signal transmission ports 350*a* and 350*b* are configured to connect to an external information processing apparatus outside an antenna 1, and are configured to implement signal transmission between the antenna 1 and the external information processing apparatus. The external information processing apparatus may be a radio frequency processing unit 5. The feed structure 360 is configured to: connect to a radiating element 500, and transmit a signal with the radiating element 500. An insulation support bracket 200 includes an insulation support bracket body 230 and two first insulation support plates 210*a* and 210*b*. The two first insulation support plates 210*a* and 210*b* are respectively located on two sides of the insulation support bracket body 230 in the third direction Z. The phase shifter 330*a* includes a reflector 100, the first sliding dielectric plate 320*a*, the phase-shifting strip line 310*a*, and the first insulation support plate 210*a* that are sequentially adjacent. The phase shifter 330*b* includes the reflector 100, the first sliding dielectric plate 320*b*, the phase-shifting strip line 310*b*, and the first insulation support plate 210*b* that are sequentially adjacent.

When the antenna 1 transmits a signal, the radio frequency processing unit 5 transmits the signal to the signal transmission port 350*a* and the signal transmission port 350*b*, transmits the signal to the phase-shifting strip line 310*a* and the phase-shifting strip line 310*b* through the signal transmission port 350*a* and the signal transmission port 350*b* respectively, and then transmits the signal to the feed structure 360 by using a power divider, a filter, or a multiplexer (not shown in the figure). The feed structure 360 radiates the received signal to external space by using the radiating element 500. In an implementation, the feed network 300 may further include the power divider, the filter, or the multiplexer (not shown in the figure). This may be disposed based on an actual requirement. Quantities and structures of the radiating elements 500 and the feed structures 360 may also be set based on an actual requirement. This is not limited in this disclosure. Changed phases of signals in the phase shifter 330*a* and the phase shifter 330*b* may be the same or different, and may be set based on an actual requirement.

Figure 11A:
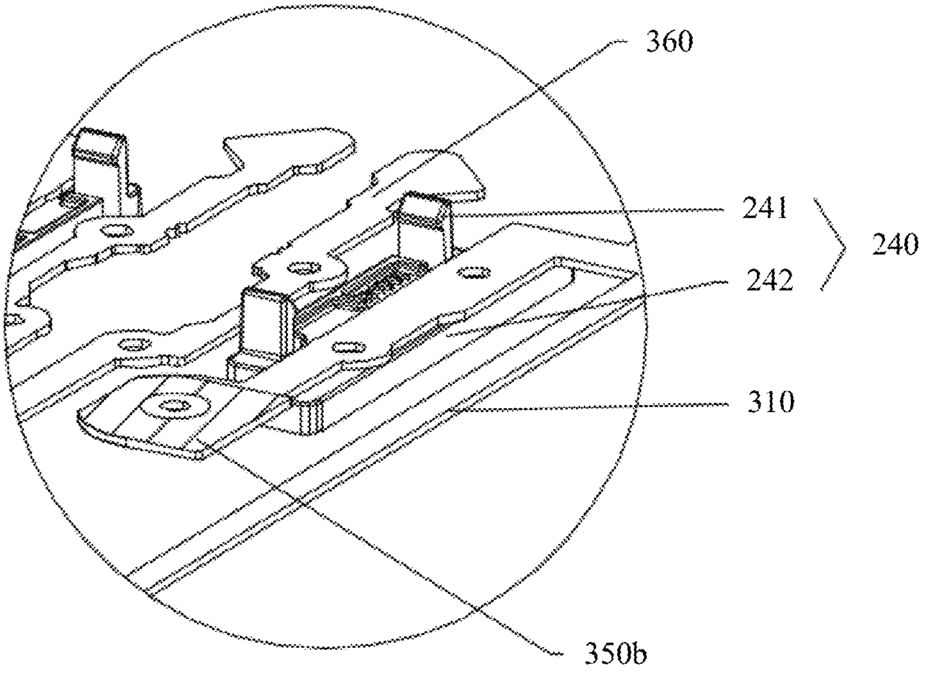
FIG. 11*a* is a locally enlarged diagram of a part M in FIG. 10.
Figure 11B:
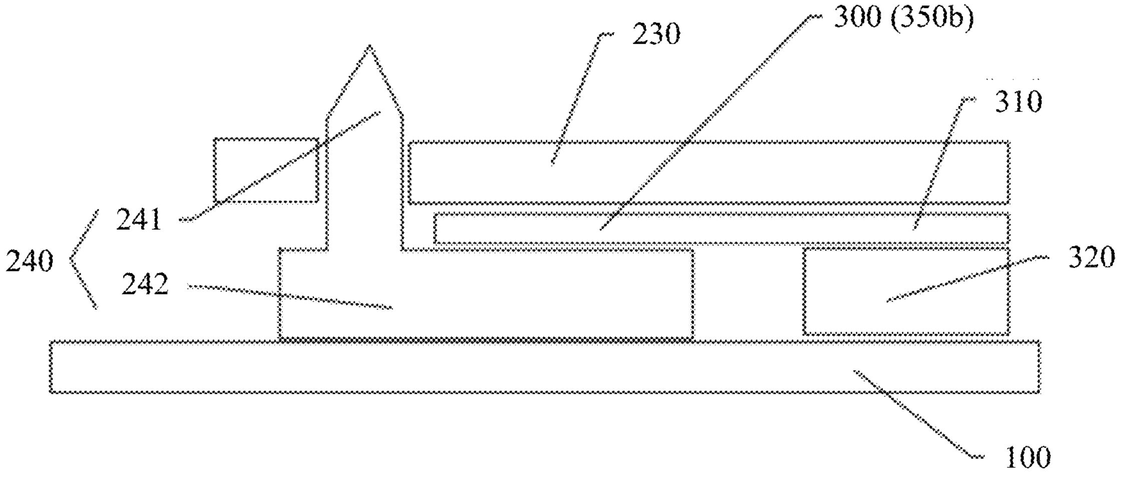
FIG. 11*b* is a diagram of a structure of an antenna according to an embodiment of this disclosure.

In this embodiment, a part, other than the phase-shifting strip line 310*a* and the phase-shifting strip line 310*b*, in the feed network 300, is located between the insulation support bracket body 230 and the reflector 100. With reference to FIG. 10, FIG. 11*a*, and FIG. 11*b*, FIG. 11*a* is a locally enlarged diagram of a part M in FIG. 10, and FIG. 11*b* is a sectional view of the part M in FIG. 10. As shown in FIG. 10, the feed network 300 is fastened on the insulation support bracket body 230 by using a fastener 240. As shown in FIG. 11*a*, the fastener 240 includes a fastening pad 242 and a fastening plug-in 241 that are connected to each other. The fastening pad 242 is located below a middle part of the feed network 300, for example, located below the signal transmission port 350*b*, and is configured to support the feed network 300. As shown in FIG. 11*b*, the first sliding dielectric plate 320 is disposed between the phase-shifting strip line 310 and the reflector 100. Therefore, a lower part of the middle part of the feed network 300 is aerial, and the fastening pad 242 is disposed below the middle part of the feed network 300, to implement a support function and improve structural strength of the feed network 300. A fastening hole matching the fastening plug-in 241 may be provided in the insulation support bracket body 230, and the fastening plug-in 241 is inserted into the fastening hole to fasten the feed network 300 on the insulation support bracket body 230.

Figure 12:
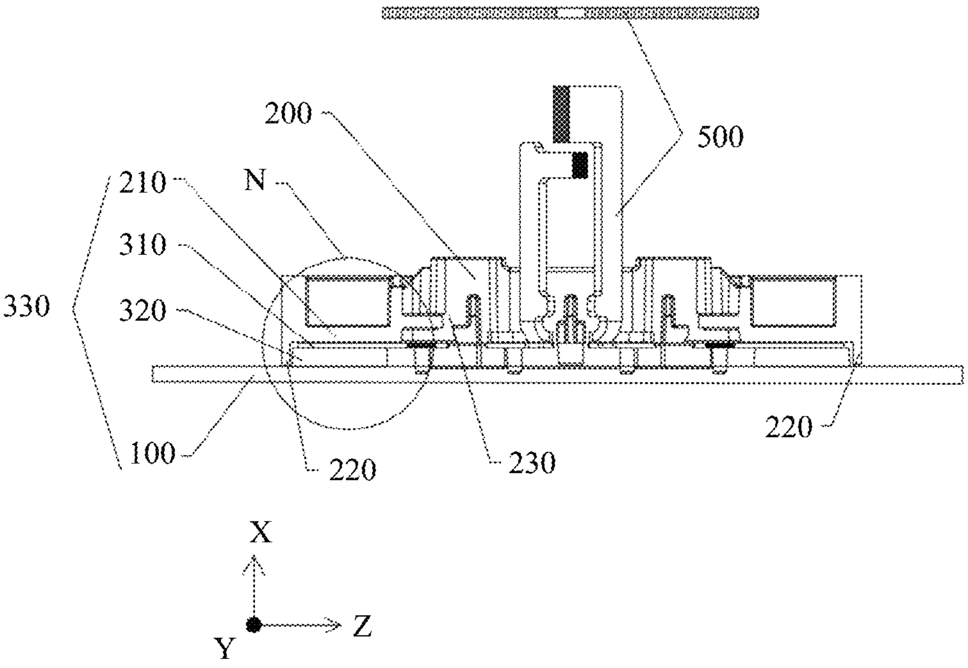
FIG. 12 is a side view of an antenna according to an embodiment of this disclosure.
Figure 13:
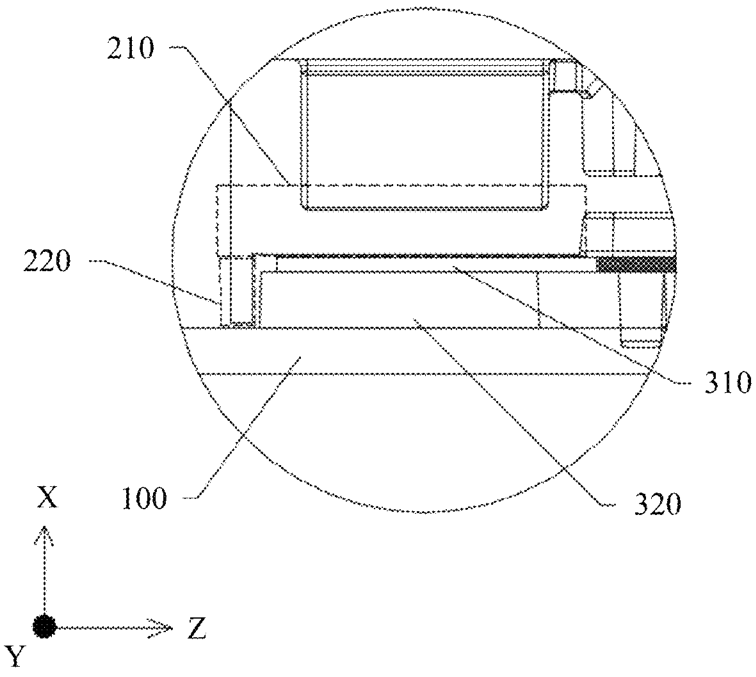
FIG. 13 is a locally enlarged diagram of a part N in FIG. 12.

FIG. 12 is a diagram of a structure of an antenna according to another possible embodiment of this disclosure based on FIG. 4 to FIG. 7. FIG. 13 is a locally enlarged diagram of a part N in FIG. 12. In an embodiment, an insulation support bracket 200 further includes a first insulation side plate 220, the first insulation side plate 220 is located on a side that is of a first insulation support plate 210 and that faces a reflector 100, the first insulation side plate 220 and a phase-shifting strip line 310 are disposed side by side, both the first insulation side plate 220 and the phase-shifting strip line 310 extend in a second direction Y, and the second direction Y intersects with a first direction X. In this embodiment, the first insulation side plate 220 may be located on a side that is of a first sliding dielectric plate 320 and that is away from an insulation support bracket body 230. The first insulation side plate 220 is configured to provide guidance for the first sliding dielectric plate 320, so that the first sliding dielectric plate 320 can slide only in the second direction Y. In this embodiment, the phase-shifting strip line 310 and the first sliding dielectric plate 320 are disposed side by side with the first insulation side plate 220, and the first sliding dielectric plate 320, the first insulation side plate 220, and the phase-shifting strip line 310 extend in the second direction Y. In other words, the phase-shifting strip line 310 and the first sliding dielectric plate 320 are located on a same side of the first insulation side plate 220 in a third direction Z, and any two of the third direction Z, the second direction Y, and the first direction X intersect. For example, any two of the third direction Z, the second direction Y, and the first direction X vertically intersect. The first direction X is a thickness direction of the antenna 1. When the second direction Y is a width direction of the antenna 1, the third direction Z is a length direction of the antenna 1; or when the second direction Y is a length direction of the antenna 1, the third direction Z is a width direction of the antenna 1.

Figure 14A:
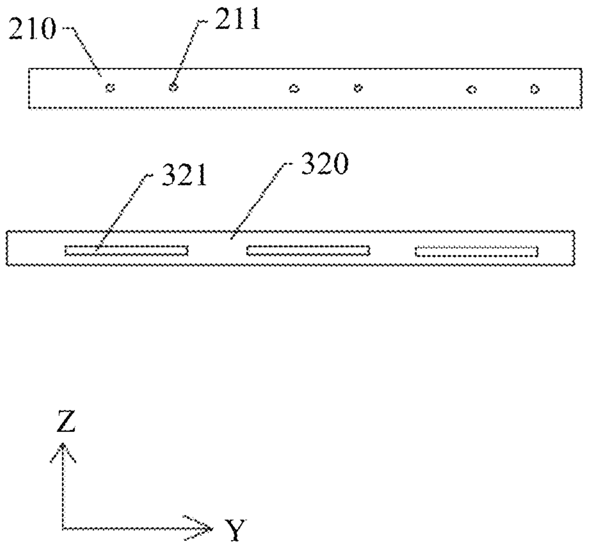
FIG. 14*a* is a diagram of structures of a first insulation support plate and a first sliding dielectric plate in an antenna according to an embodiment of this disclosure.
Figure 14B:
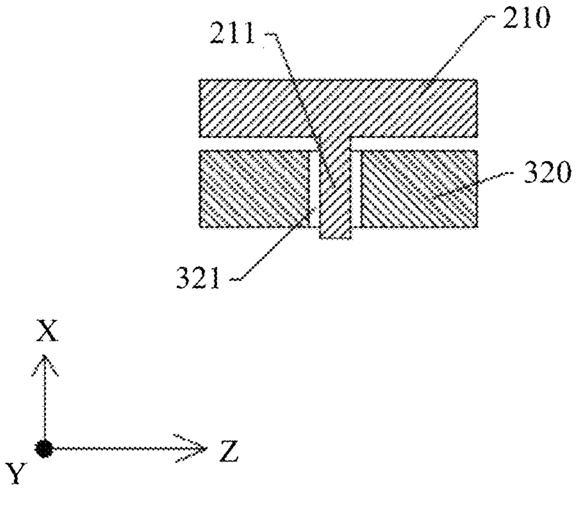
FIG. 14*b* is a sectional view of a first insulation support plate and a first sliding dielectric plate in an antenna according to an embodiment of this disclosure.

FIG. 14*a* and FIG. 14*b* each are a diagram of a structure of an antenna according to another possible embodiment of this disclosure based on FIG. 4 to FIG. 7. Refer to FIG. 14*a* and FIG. 14*b*. An upper part and a lower part of FIG. 14*a* are respectively a diagram of a structure of a surface that is of a first insulation support plate 210 and that faces a first sliding dielectric plate 320 and a diagram of a structure of a surface that is of the first sliding dielectric plate 320 and that faces the first insulation support plate 210. FIG. 14*b* is a sectional view after the first insulation support plate 210 and the first sliding dielectric plate 320 in FIG. 14*a* are assembled. In an embodiment, the first sliding dielectric plate 320 is provided with a first hole 321 that penetrates the first sliding dielectric plate 320, the first hole 321 extends in a second direction Y, a plurality of first pins 211 arranged in the second direction Y are disposed on a surface that is of the first insulation support plate 210 and that faces a reflector 100, the first pin 211 passes through the first hole 321 and can slide relative to the first hole 321, and the second direction Y intersects with a first direction X and is the same as an extension direction of the first sliding dielectric plate 320. The plurality of first pins 211 arranged in the second direction Y pass through the first hole 321. When the first sliding dielectric plate 320 slides, the first sliding dielectric plate 320 can slide only in the second direction Y. In other words, the first hole 321 cooperates with the first pin 211, to guide the first sliding dielectric plate 320 to slide in the second direction Y. This avoids deviation of the first sliding dielectric plate 320 in a direction other than the second direction Y, ensures sliding control precision of the first sliding dielectric plate 320, and further improves phase-shifting precision of a phase shifter 330.

The first hole 321 is a long hole extending in the second direction Y, and the plurality of first pins 211 arranged in the second direction Y may pass through the same first hole 321. When there are a plurality of first holes 321, the plurality of first holes 321 are arranged in the second direction Y. One or more first pins 211 may be disposed in each of the plurality of first holes 321.

In a possible implementation, the first pin 211 is disposed on the first sliding dielectric plate 320, and the first hole 321 is provided on the first insulation support plate 210. The first hole 321 cooperates with the first pin 211, to guide the first sliding dielectric plate 320 to slide in the second direction Y.

Figure 15A:
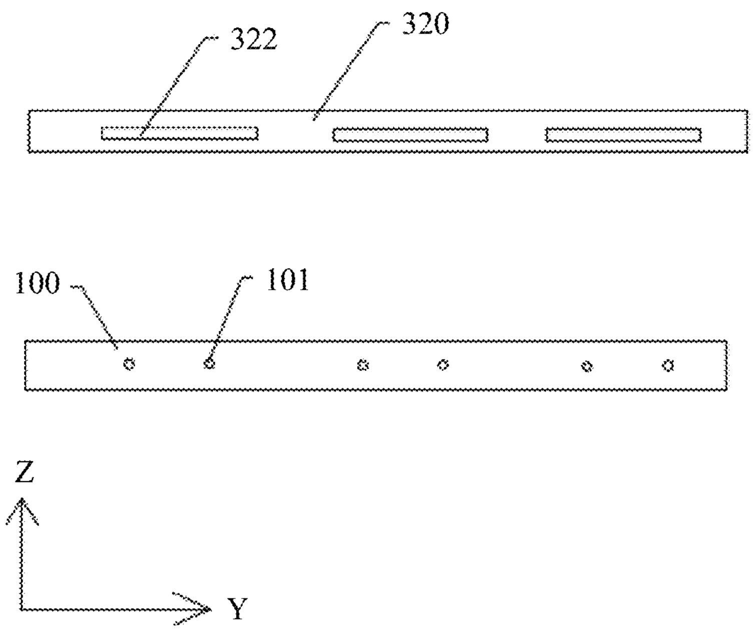
FIG. 15*a* is a diagram of structures of a reflector and a first sliding dielectric plate in an antenna according to an embodiment of this disclosure.
Figure 15B:
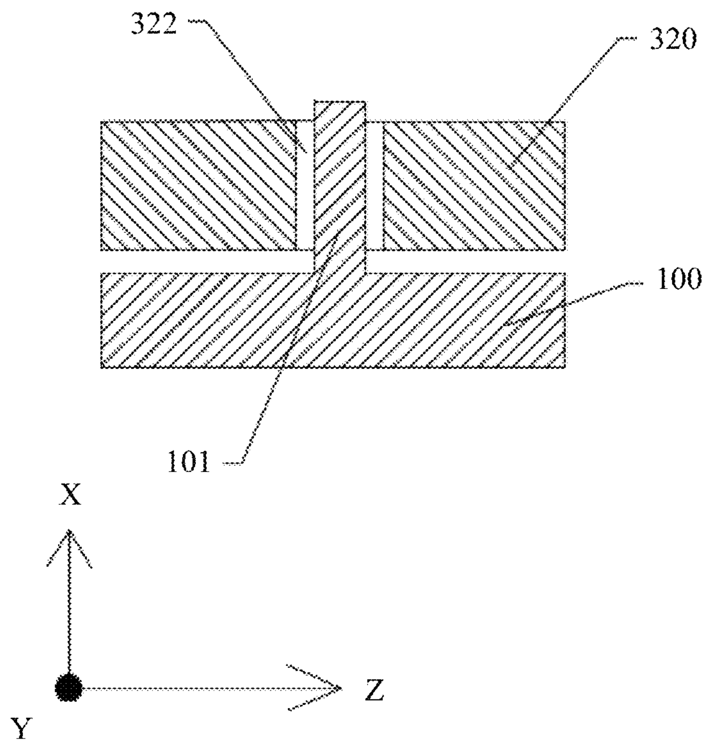
FIG. 15*b* is a sectional view of a reflector and a first sliding dielectric plate in an antenna according to an embodiment of this disclosure.

FIG. 15*a* and FIG. 15*b* each are a diagram of a structure of an antenna according to another possible embodiment of this disclosure based on FIG. 4 to FIG. 7. Refer to FIG. 15*a* and FIG. 15*b*. An upper part and a lower part of FIG. 15*a* are respectively a diagram of a structure of a surface that is of a first sliding dielectric plate 320 and that faces a reflector 100 and a diagram of a surface that is of the reflector 100 and that faces the first sliding dielectric plate 320. FIG. 15*b* is a sectional view after the reflector 100 and the first sliding dielectric plate 320 in FIG. 15*a* are assembled. In an embodiment, the first sliding dielectric plate 320 is provided with a second hole 322 that penetrates the first sliding dielectric plate 320, the second hole 322 extends in a second direction Y, a plurality of second pins 101 arranged in the second direction Y are disposed on the surface that is of the reflector 100 and that faces the first sliding dielectric plate 320, the second pin 101 passes through the second hole 322 and can slide relative to the second hole 322, and the second direction Y intersects with a first direction X and is the same as an extension direction of the first sliding dielectric plate 320. In this embodiment, the second pin 101 on the reflector 100 cooperates with the second hole 322, to guide the first sliding dielectric plate 320 to slide in the second direction Y. This avoids deviation of the first sliding dielectric plate 320 in a direction other than the second direction Y, ensures sliding control precision of the first sliding dielectric plate 320, and further improves phase-shifting precision of a phase shifter 330.

In a possible implementation, the second pin 101 is disposed on the first sliding dielectric plate 320, and the reflector 100 is provided with the second hole 322. The second hole 322 cooperates with the second pin 101, to guide the first sliding dielectric plate 320 to slide in the second direction Y.

In a possible implementation, the first sliding dielectric plate 320 may be provided with a first hole 321 and the second hole 322. The first hole 321 and the second hole 322 respectively cooperate with a first pin 211 on a first insulation support plate 210 and the second pin 101 on the reflector 100, to guide the first sliding dielectric plate 320 to slide in the second direction Y.

Figure 16:
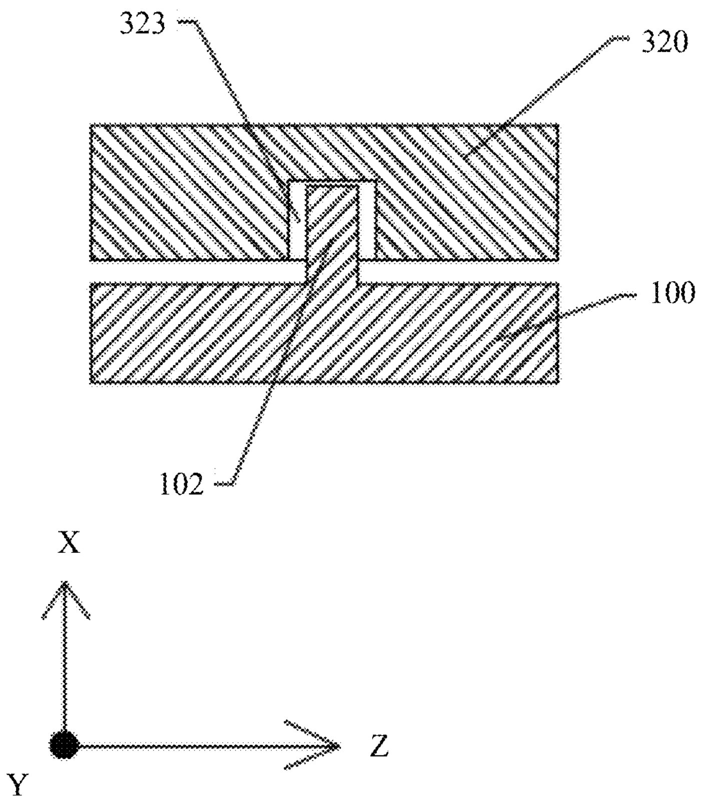
FIG. 16 is a sectional view of a reflector and a first sliding dielectric plate in an antenna according to an embodiment of this disclosure.

FIG. 16 is a diagram of a structure of an antenna according to another possible embodiment of this disclosure based on FIG. 4 to FIG. 7. Refer to FIG. 16. In an embodiment, a surface that is of a first sliding dielectric plate 320 and that faces a reflector 100 is provided with a first groove 323, a first protrusion portion 102 is disposed on a surface that is of the reflector 100 and that faces the first sliding dielectric plate 320, the first groove 323 and the first sliding dielectric plate 320 extend in a same direction, and the first protrusion portion 102 is located in the first groove 323 and can slide relative to the first groove 323. In this implementation, the first protrusion portion 102 cooperates with the first groove 323, to guide the first sliding dielectric plate 320 to slide in a second direction Y relative to a phase-shifting strip line 310. An extension direction of the first protrusion portion 102 is the same as that of the first groove 323 and the first sliding dielectric plate 320, and is the second direction Y. In some implementations, when the first protrusion portion 102 is in a pin shape, a plurality of first protrusion portions 102 may be disposed, and the plurality of first protrusion portions 102 are arranged in the second direction Y.

Figure 17:
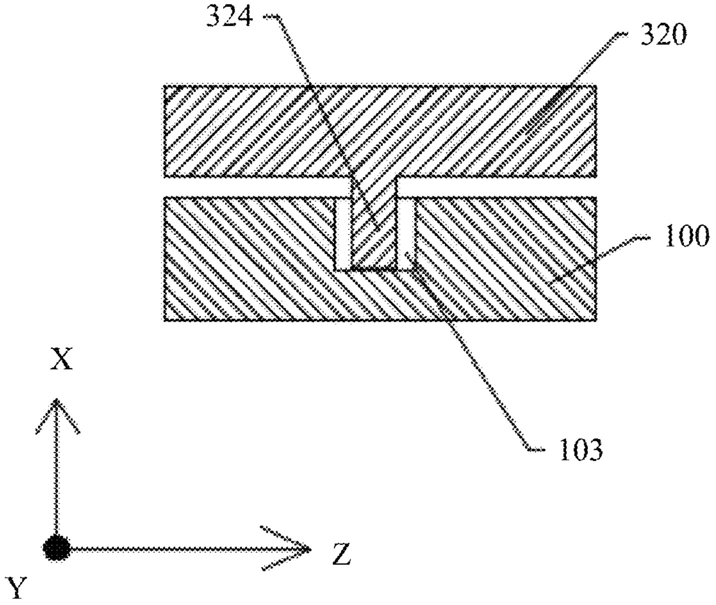
FIG. 17 is a sectional view of a reflector and a first sliding dielectric plate in an antenna according to an embodiment of this disclosure.

FIG. 17 is a diagram of a structure of an antenna according to another possible embodiment of this disclosure based on FIG. 4 to FIG. 7. Refer to FIG. 17. In an embodiment, a second protrusion portion 324 is disposed on a surface that is of a first sliding dielectric plate 320 and that faces a reflector 100, a surface that is of the reflector 100 and that faces the first sliding dielectric plate 320 is provided with a second groove 103, the second groove 103 and the first sliding dielectric plate 320 extend in a same direction, and the second protrusion portion 324 is located in the second groove 103. In this implementation, the second protrusion portion 324 cooperates with the second groove 103, to guide the first sliding dielectric plate 320 to slide in a second direction Y relative to a phase-shifting strip line 310. An extension direction of the second protrusion portion 324 is the same as that of the second groove 103 and the first sliding dielectric plate 320, and is the second direction Y. In some implementations, when the second protrusion portion 324 is in a pin shape, a plurality of second protrusion portions 324 may be disposed, and the plurality of second protrusion portions 324 are arranged in the second direction Y.

In a possible implementation, a protrusion portion may be further disposed on a surface that is of a first insulation support plate 210 and that faces the first sliding dielectric plate 320, and a surface that is of the first sliding dielectric plate 320 and that faces the first insulation support plate 210 may be further provided with a groove. The groove cooperates with the protrusion portion, to guide the first sliding dielectric plate 320 to slide in the second direction Y relative to the phase-shifting strip line 310.

In a possible implementation, a surface that is of a first insulation support plate 210 and that faces the first sliding dielectric plate 320 may be further provided with a groove, and a protrusion portion may be further disposed on a surface that is of the first sliding dielectric plate 320 and that faces the first insulation support plate 210. The groove cooperates with the protrusion portion, to guide the first sliding dielectric plate 320 to slide in the second direction Y relative to the phase-shifting strip line 310.

In a possible implementation, a groove may be further provided and a first pin 211 may be further disposed on a first insulation support plate 210, and a protrusion portion may be further disposed and a first hole 321 may be further provided on the first sliding dielectric plate 320. The groove and the first pin 211 respectively cooperate with the protrusion portion and the first hole 321, to guide the first sliding dielectric plate 320 to slide.

Figure 18:
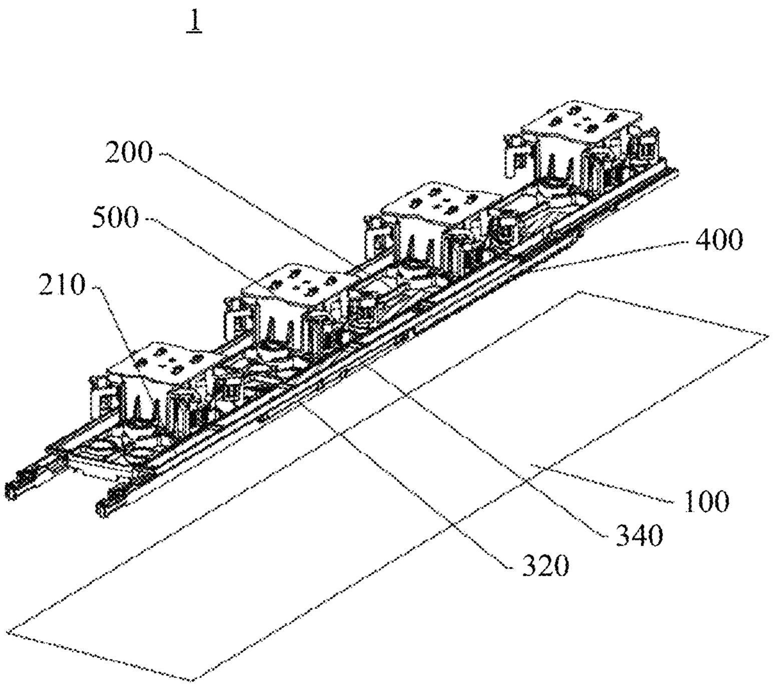
FIG. 18 is a diagram of a structure of an antenna according to an embodiment of this disclosure.
Figure 19:
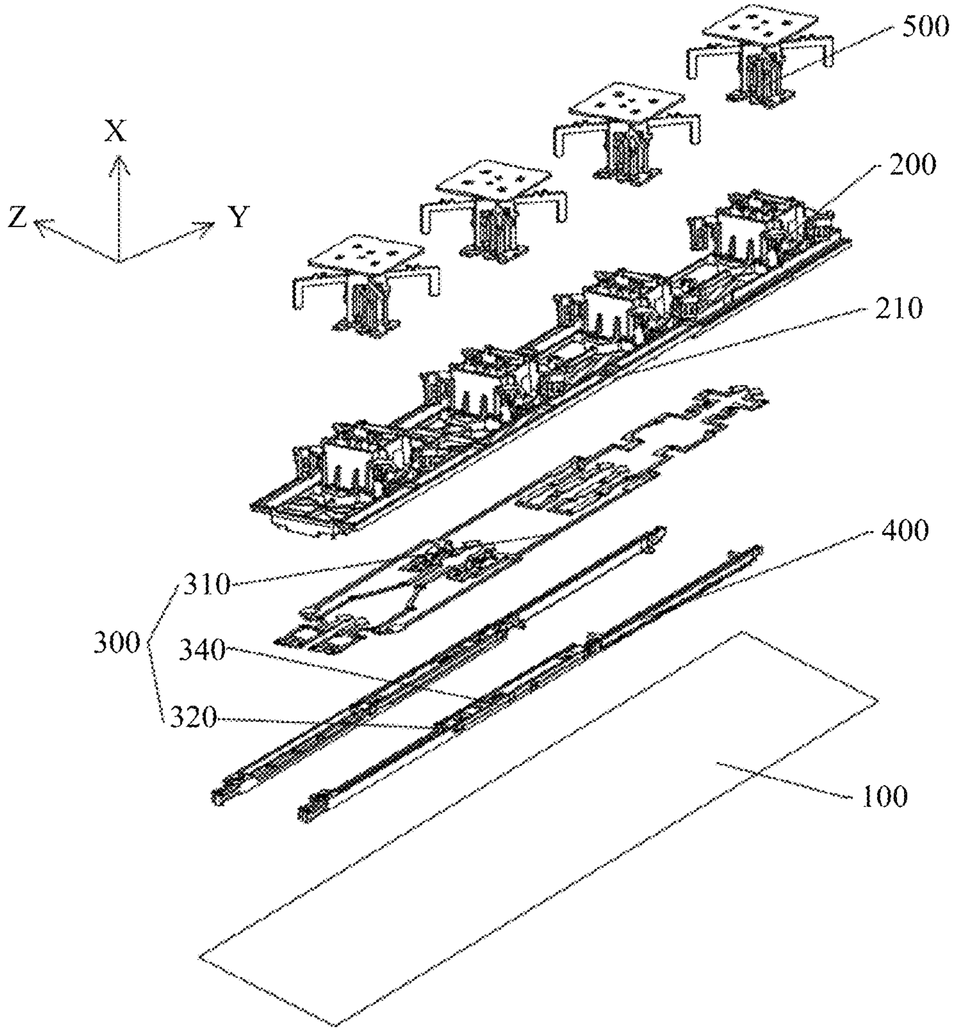
FIG. 19 is an exploded view of an antenna according to an embodiment of this disclosure.
Figure 20:
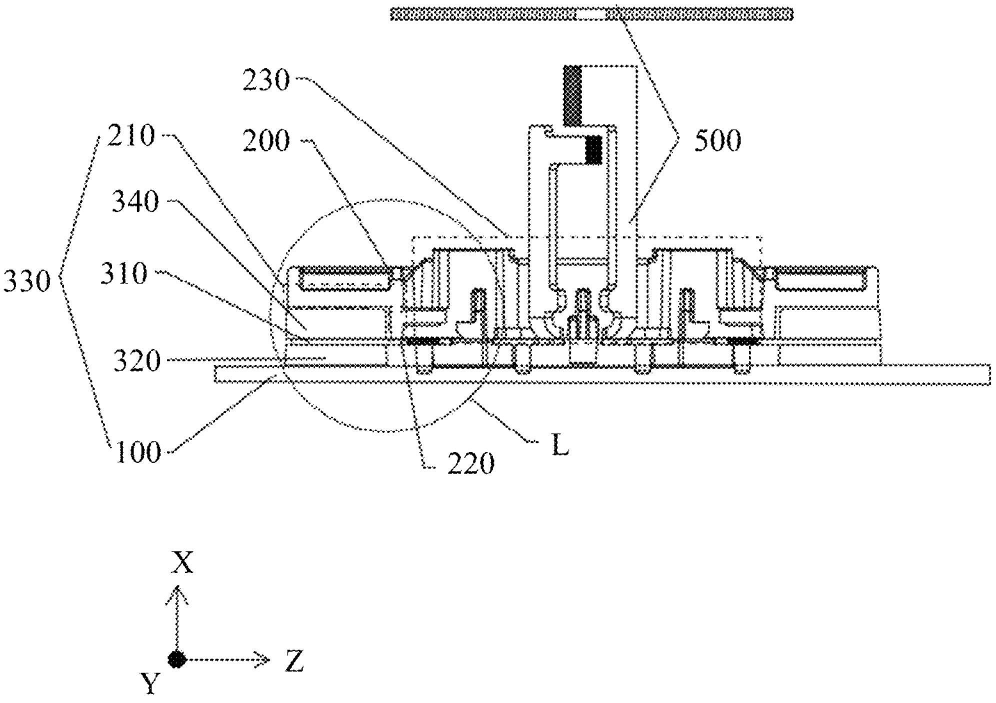
FIG. 20 is a side view of an antenna according to an embodiment of this disclosure.
Figure 21:
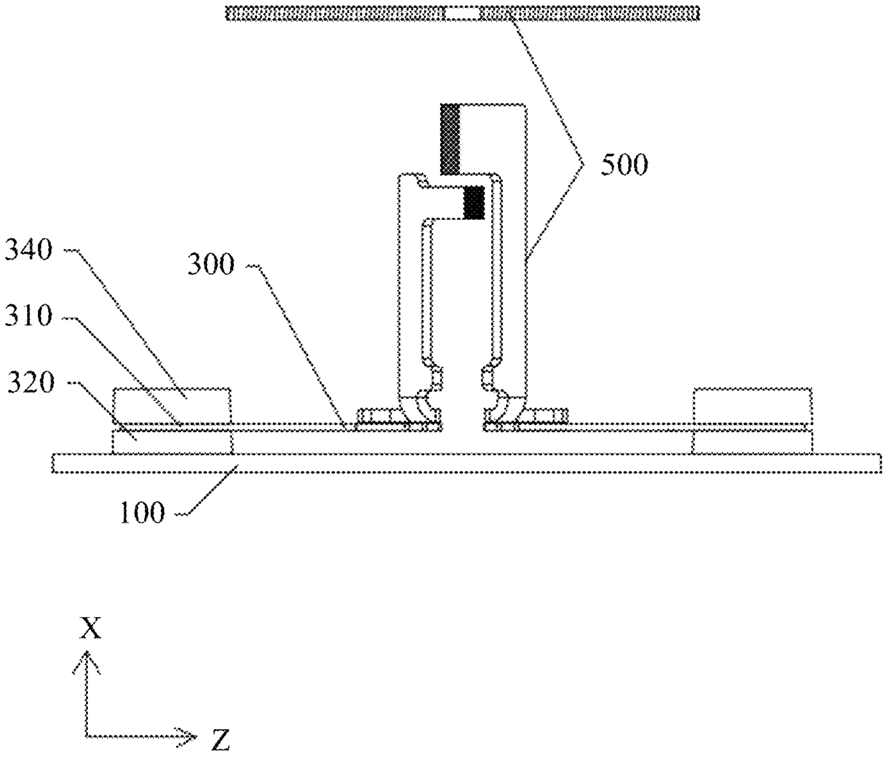
FIG. 21 is a side view of an antenna without an insulation support bracket according to an embodiment of this disclosure.

FIG. 18 is a diagram of a structure of an antenna according to another possible embodiment of this disclosure based on FIG. 4 to FIG. 7. FIG. 19 is a three-dimensional exploded view of the antenna 1 in FIG. 18. FIG. 20 is a side view of the antenna 1 in FIG. 18. FIG. 21 is a side view of the antenna 1 without an insulation support bracket 200 based on FIG. 20. In an embodiment, different from the embodiment shown in FIG. 4 to FIG. 7, the antenna 1 further includes a second sliding dielectric plate 340, and the second sliding dielectric plate 340 is located between a first insulation support plate 210 and a phase-shifting strip line 310. As shown in FIG. 20, in this implementation, the first insulation support plate 210, the second sliding dielectric plate 340, the phase-shifting strip line 310, a first sliding dielectric plate 320, and a reflector 100 are sequentially disposed in a first direction X. The second sliding dielectric plate 340 may be connected to the first sliding dielectric plate 320. A phase shifter 330 of a feed network 300 includes the first insulation support plate 210, the second sliding dielectric plate 340, the phase-shifting strip line 310, the first sliding dielectric plate 320, and the reflector 100.

A material of the second sliding dielectric plate 340 and a material of the first sliding dielectric plate 320 may be the same. The material is an insulation medium. The second sliding dielectric plate 340 and the first sliding dielectric plate 320 are fastened, so that the second sliding dielectric plate 340 and the first sliding dielectric plate 320 can slide simultaneously. A transmission mechanism 400 may be fastened to the first sliding dielectric plate 320 or the second sliding dielectric plate 340. For example, as shown in FIG. 19, the transmission mechanism 400 drives the first sliding dielectric plate 320 to slide, and the first sliding dielectric plate 320 drives the second sliding dielectric plate 340 to slide. The second sliding dielectric plate 340 and the first sliding dielectric plate 320 simultaneously slide relative to the phase-shifting strip line 310, and jointly affect a phase of a signal in the phase-shifting strip line 310.

Figure 22:
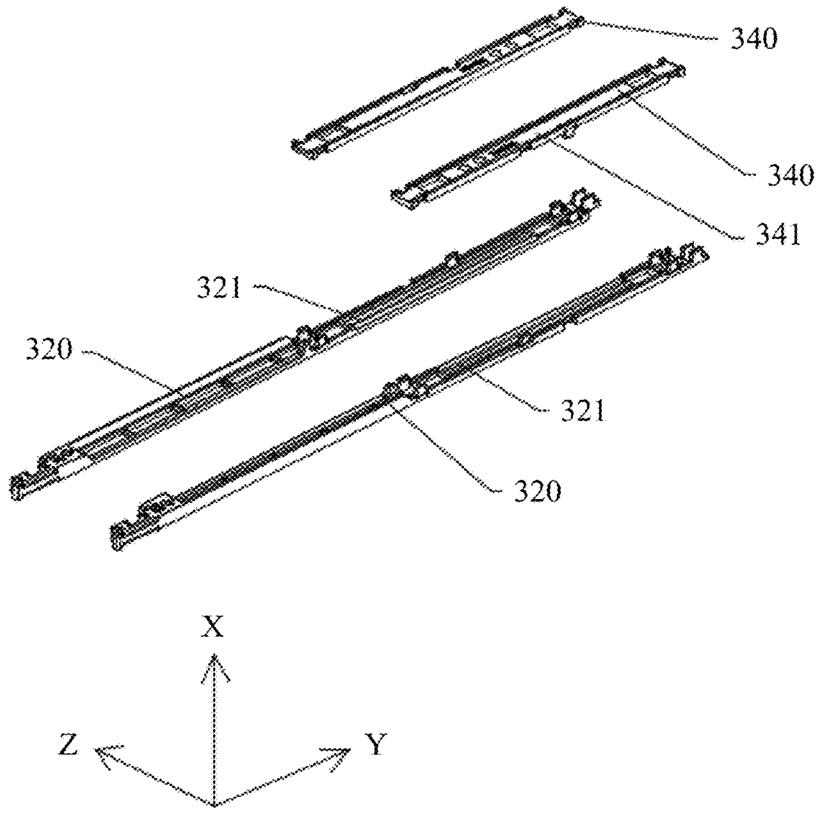
FIG. 22 is a diagram of structures of a first sliding dielectric plate and a second sliding dielectric plate in an antenna according to an embodiment of this disclosure.
Figure 23:
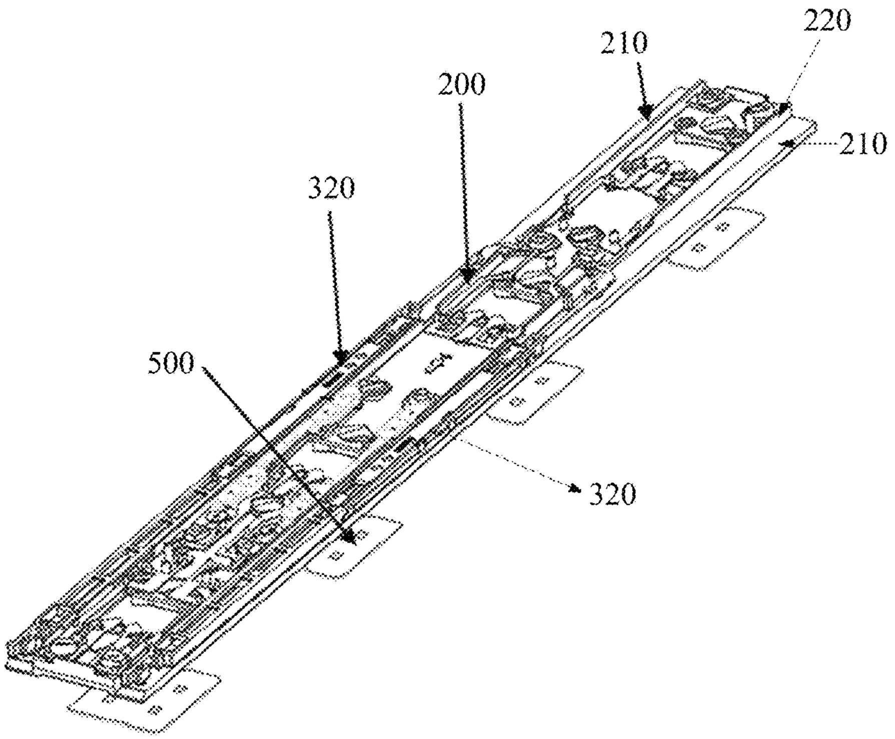
FIG. 23 is a diagram of a structure of an antenna according to an embodiment of this disclosure.

FIG. 22 is a diagram of structures of the first sliding dielectric plate 320 and the second sliding dielectric plate 340 in the antenna 1 shown in FIG. 19. FIG. 23 is a diagram of a structure of the antenna 1 shown in FIG. 19 from a side of the reflector 100. In a possible implementation, a surface that is of the second sliding dielectric plate 340 and that is away from the phase-shifting strip line 310 is provided with a third groove 341, and a surface that is of the first insulation support plate 210 and that faces the second sliding dielectric plate 340 is a plane. The third groove 341 is configured to reduce a contact area between the first insulation support plate 210 and the second sliding dielectric plate 340, to reduce friction, so that the second sliding dielectric plate 340 slides more easily.

Still refer to FIG. 22. In a possible implementation, a surface that is of the first sliding dielectric plate 320 and that faces the phase-shifting strip line 310 is further provided with an accommodation groove 321, and the phase-shifting strip line 310 is at least partially located in the accommodation groove 321.

As shown in FIG. 22, lengths of the second sliding dielectric plate 340 and the first sliding dielectric plate 320 in a second direction Y are different. However, in some implementations, the lengths of the second sliding dielectric plate 340 and the first sliding dielectric plate 320 may be the same.

Figure 24:
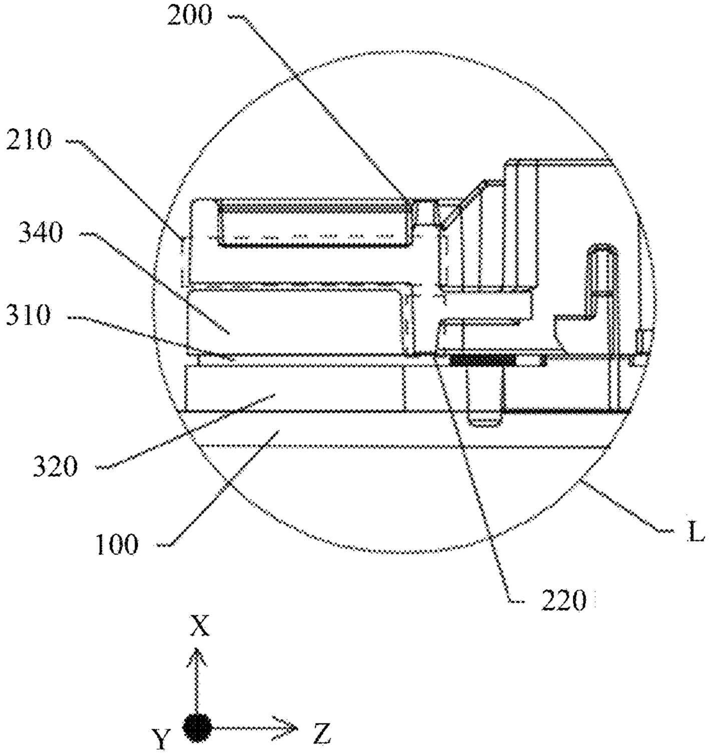
FIG. 24 is a locally enlarged diagram of a part L in FIG. 20.

With reference to FIG. 20 and FIG. 24, FIG. 24 is a locally enlarged diagram of a part L in FIG. 20. In a possible implementation, the insulation support bracket 200 further includes a first insulation side plate 220, the first insulation side plate 220 is located on a side that is of the first insulation support plate 210 and that faces the reflector 100, the first insulation side plate 220 and the phase-shifting strip line 310 are disposed side by side, both the first insulation side plate 220 and the phase-shifting strip line 310 extend in the second direction Y, and the second direction Y intersects with the first direction X. In this implementation, the phase-shifting strip line 310 and the second sliding dielectric plate 340 are disposed side by side with the first insulation side plate 220 in a third direction Z. In other words, the phase-shifting strip line 310 and the second sliding dielectric plate 340 are located on a same side of the first insulation side plate 220 in the third direction Z.

As shown in FIG. 20, the insulation support bracket 200 further includes an insulation support bracket body 230, the first insulation support plate 210 and the insulation support bracket body 230 are disposed side by side in the third direction Z, the first insulation side plate 220 is located at an end that is of the first insulation support plate 210 that is close to the insulation support bracket body 230, and the second sliding dielectric plate 340 is located on a side that is of the first insulation side plate 220 and that is away from the insulation support bracket body 230. The first insulation side plate 220 may provide guidance for the second sliding dielectric plate 340 to slide, so that the second sliding dielectric plate 340 can slide only in the second direction Y. This avoids deviation of the second sliding dielectric plate 340 in a direction other than the second direction Y, ensures sliding control precision of the second sliding dielectric plate 340, and further improves phase-shifting precision of the phase shifter 330.

Figure 25:
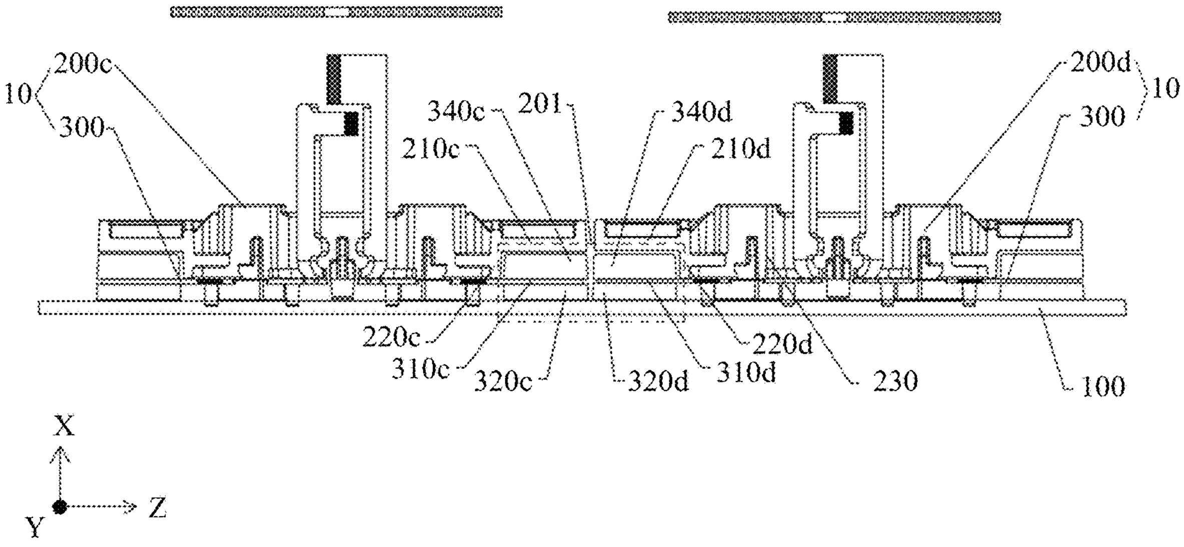
FIG. 25 is a side view of an antenna according to an embodiment of this disclosure.

FIG. 25 is a diagram of a structure of an antenna according to another possible embodiment of this disclosure based on FIG. 18 to FIG. 21. As shown in FIG. 25, in an embodiment, the antenna 1 includes a plurality of antenna structures 10. The plurality of antenna structures 10 are disposed on a same side of a reflector 100. Each of the plurality of antenna structures 10 includes an insulation support bracket 200 and a feed network 300. Insulation support brackets 200 in two adjacent antenna structures 10 are respectively denoted as a first insulation support bracket **200*c* and a second insulation support bracket 200*d*. A first insulation side plate 220 in the first insulation support bracket 200*c* is denoted as a first insulation side plate 220*c*, and a first insulation side plate 220 in the second insulation support bracket 200*d* is denoted as a first insulation side plate 220*d*. The first insulation side plate 220*c* and the first insulation side plate 220*d* are disposed opposite to each other. The first insulation side plate 220***c*, the first insulation side plate 220*d*, a first insulation support plate 210*c* and a first insulation support plate 210*d* that are between the first insulation side plate 220*c* and the first insulation side plate 220*d*, and the reflector 100 are enclosed to form accommodation space 201 enclosed by a dashed line in FIG. 25. A first sliding dielectric plate 320*c*, a first sliding dielectric plate 320*d*, a second sliding dielectric plate 340*c*, and a second sliding dielectric plate 340*d* in two adjacent antenna structures 10 are located in the accommodation space 201. Parts forming the accommodation space 201 may be configured to guide the first sliding dielectric plate 320*c*, the first sliding dielectric plate 320*d*, the second sliding dielectric plate 340*c*, and the second sliding dielectric plate 340*d* to slide.

Figure 26:
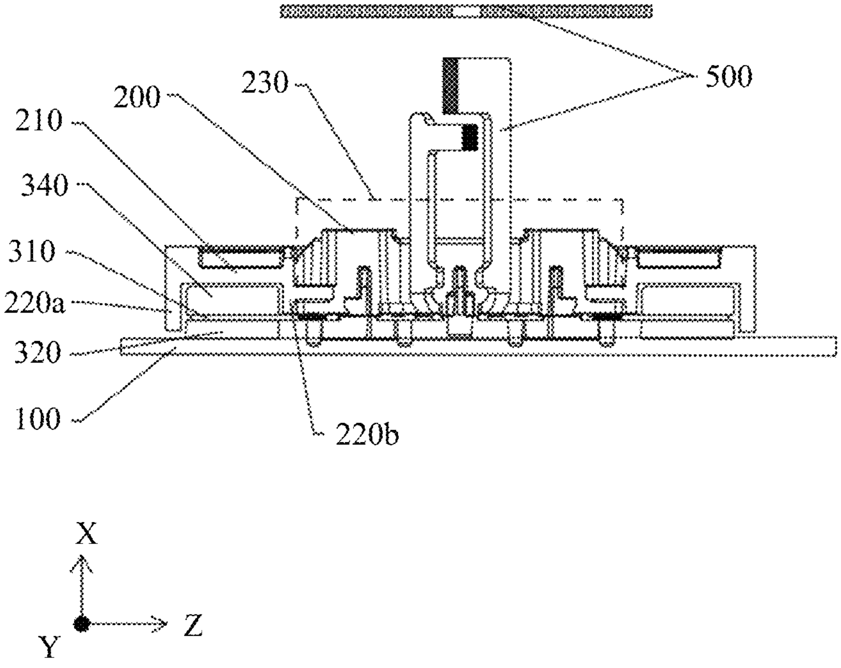
FIG. 26 is a side view of an antenna according to an embodiment of this disclosure.

FIG. 26 is a diagram of a structure of an antenna according to another possible embodiment of this disclosure based on FIG. 18 to FIG. 21. As shown in FIG. 26, an insulation support bracket 200 includes two first insulation side plates 220*a* and 220*b*, and the first insulation side plate 220*a* and the first insulation side plate 220*b* are oppositely disposed at two ends of a first insulation support plate 210 in a third direction Z. Both the two first insulation side plates 220*a* and 220*b* extend in a second direction Y, to provide guidance for a second sliding dielectric plate 340 to slide, so that the second sliding dielectric plate 340 can slide only in the second direction Y. This avoids deviation of the second sliding dielectric plate 340 in a direction other than the second direction Y, ensures sliding control precision of the second sliding dielectric plate 340, and further improves phase-shifting precision of a phase shifter 330.

In the embodiment shown in FIG. 26, compared with the first insulation side plate 220*b*, the first insulation side plate 220*a* is disposed away from an insulation support bracket body 230. A length of the first insulation side plate 220*a* in a first direction X is greater than a length of the first insulation side plate 220 in the first direction X, and the first insulation side plate 220*a* extends to an outer side of a first sliding dielectric plate 320 in the first direction X, to block sliding of the first sliding dielectric plate 320 to the outer side. The outer side of the first sliding dielectric plate 320 is a side that is of the first sliding dielectric plate 320 and that is away from the insulation support bracket body 230.

Figure 27:
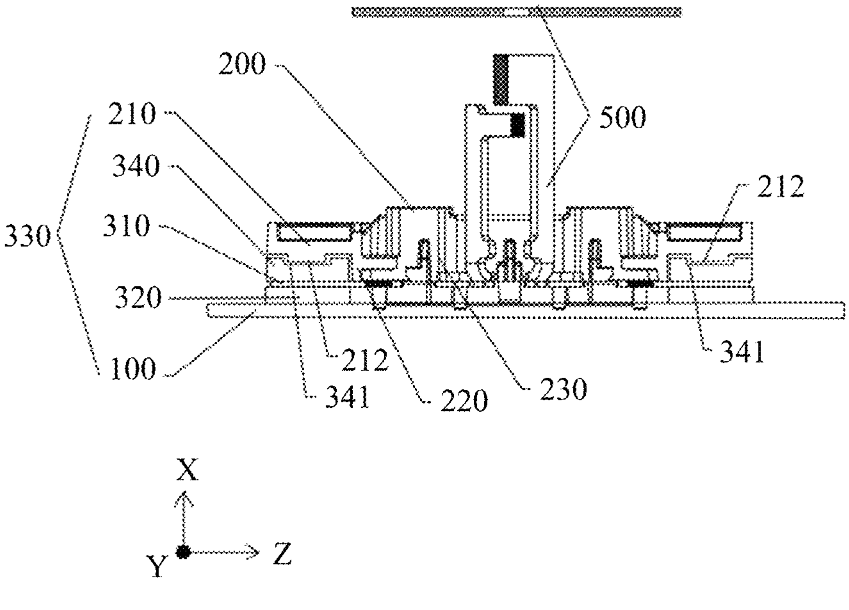
FIG. 27 is a side view of an antenna according to an embodiment of this disclosure.

FIG. 27 is a diagram of a structure of an antenna according to another possible embodiment of this disclosure based on FIG. 18 to FIG. 21. As shown in FIG. 27, in an embodiment, a surface that is of a second sliding dielectric plate 340 and that is away from a phase-shifting strip line 310 is provided with a third groove 341, a third protrusion portion 212 is disposed on a surface that is of a first insulation support plate 210 and that faces the second sliding dielectric plate 340, the third groove 341 and the second sliding dielectric plate 340 extend in a same direction, and the third protrusion portion 212 is located in the third groove 341 and can slide relative to the third groove 341. The extension direction of the third groove 341 and the second sliding dielectric plate 340 is a second direction Y. The third groove 341 cooperates with the third protrusion portion 212, so that the second sliding dielectric plate 340 can slide only in the second direction Y. This avoids deviation of the second sliding dielectric plate 340 in a direction other than the second direction Y, ensures sliding control precision of the second sliding dielectric plate 340, and further improves phase-shifting precision of a phase shifter 330.

Figure 28:
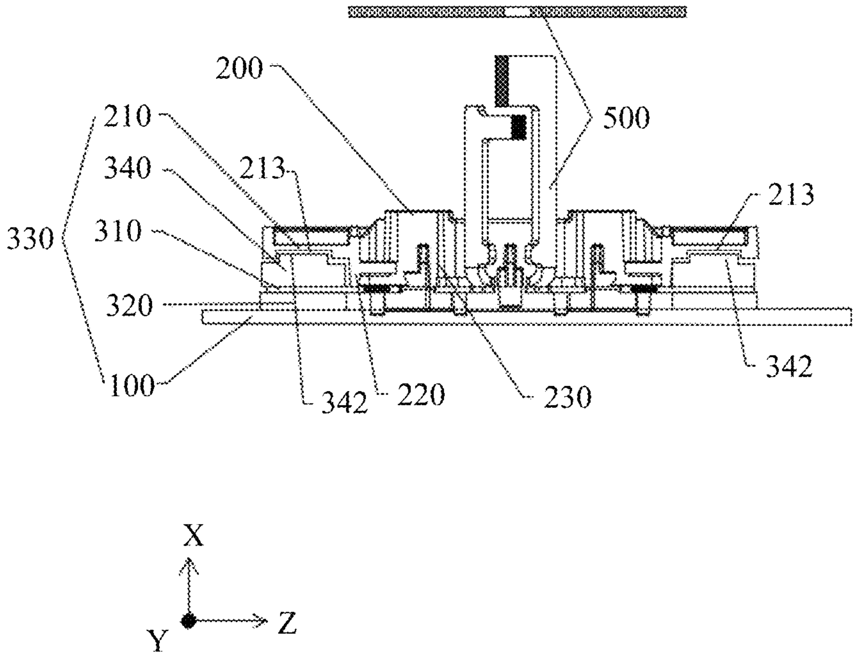
FIG. 28 is a side view of an antenna according to an embodiment of this disclosure.

FIG. 28 is a diagram of a structure of an antenna according to another possible embodiment of this disclosure based on FIG. 18 to FIG. 21. As shown in FIG. 28, in an embodiment, a fourth protrusion portion 342 is disposed on a surface that is of a second sliding dielectric plate 340 and that is away from a phase-shifting strip line 310, a surface that is of a first insulation support plate 210 and that faces the second sliding dielectric plate 340 is provided with a fourth groove 213, the fourth groove 213 and the second sliding dielectric plate 340 extend in a same direction, and the fourth protrusion portion 342 is located in the fourth groove 213 and can slide relative to the fourth groove 213. In this implementation, the extension direction of the fourth groove 213 and the second sliding dielectric plate 340 is a second direction Y. The fourth protrusion portion 342 cooperates with the fourth groove 213, so that the second sliding dielectric plate 340 can slide only in the second direction Y. This avoids deviation of the second sliding dielectric plate 340 in a direction other than the second direction Y, ensures sliding control precision of the second sliding dielectric plate 340, and further improves phase-shifting precision of a phase shifter 330.

It should be noted that, in the embodiment shown in FIG. 18 to FIG. 21 and the embodiment shown in FIG. 25 to FIG. 28, for the antenna in each embodiment, the second sliding dielectric plate 340 may be further provided with a long hole, and a pin may be further disposed on the surface that is of the first insulation support plate 210 and that faces the second sliding dielectric plate 340. Alternatively, a pin is disposed on the surface that is of the second sliding dielectric plate 340 and that faces the first insulation support plate 210, and the first insulation support plate 210 is provided with a long hole. The pin cooperates with the long hole, to guide the second sliding dielectric plate 340 to slide.

In a possible implementation, a pin and a long hole on the second sliding dielectric plate 340 and the first insulation support plate 210 cooperate with each other, and a long hole and a pin on the first sliding dielectric plate 320 and the reflector 100 cooperate with each other (as shown in FIG. 15*b*), to jointly guide the first sliding dielectric plate 320 and the second sliding dielectric plate 340 to slide.

In a possible implementation, a protrusion portion and a groove on the second sliding dielectric plate 340 and the first insulation support plate 210 cooperate with each other (as shown in FIG. 27), and a protrusion portion and a groove on the first sliding dielectric plate 320 and the reflector 100 cooperate with each other (as shown in FIG. 17), to jointly guide the first sliding dielectric plate 320 and the second sliding dielectric plate 340 to slide.

Figure 29:
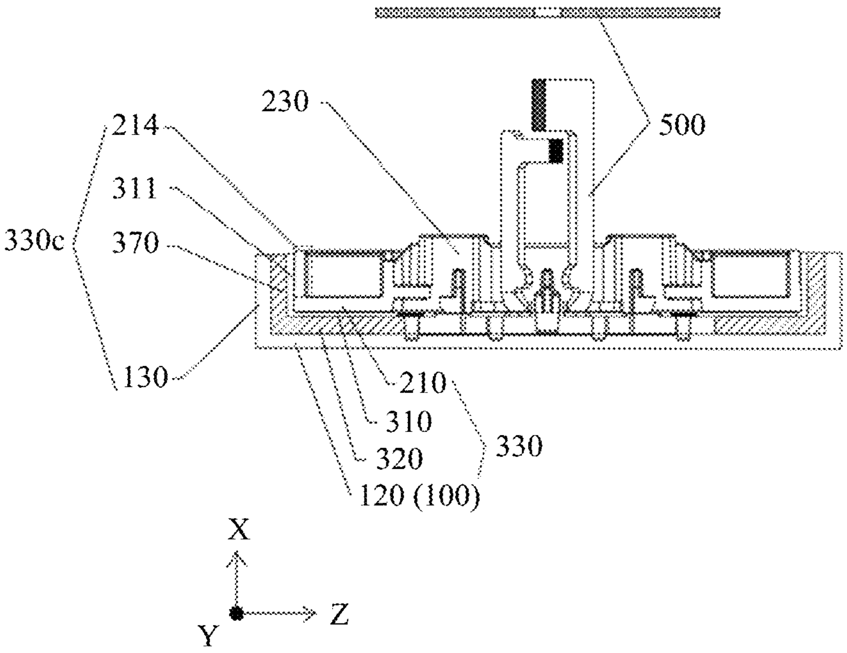
FIG. 29 is a side view of an antenna according to an embodiment of this disclosure.

FIG. 29 is a diagram of a structure of an antenna according to another possible embodiment of this disclosure based on FIG. 4 to FIG. 7. Refer to FIG. 29. The antenna in this implementation further includes a third sliding dielectric plate 370 and a first side phase-shifting strip line 311. Specifically, in this implementation, a reflector 100 includes a reflector body 120 and a reflective side plate 130, and the reflective side plate 130 is located at an edge of the reflector body 120, and is connected to and intersects with the reflector body 120. An insulation support bracket 200 further includes a second insulation side plate 214. The second insulation side plate 214 is located at an end that is of a first insulation support plate 210 and that is away from an insulation support bracket body 230. One end of the second insulation side plate 214 is connected to and intersects with the first insulation support plate 210, and the other end of the second insulation side plate 214 is disposed away from the reflector 100. Cross-sections of the second insulation side plate 214 and the first insulation support plate 210 are in an "L" shape.

A feed network 300 further includes the first side phase-shifting strip line 311 and the third sliding dielectric plate

370. The first side phase-shifting strip line 311 is connected to a phase-shifting strip line 310, and the third sliding dielectric plate 370 is connected to a first sliding dielectric plate 320. Cross-sections of the third sliding dielectric plate 370 and the first sliding dielectric plate 320 are in an "L" shape. The reflective side plate 130, the third sliding dielectric plate 370, the first side phase-shifting strip line 311, and the second insulation side plate 214 are sequentially adjacent in a third direction Z. The third sliding dielectric plate 370 may slide in a second direction Y relative to the first side phase-shifting strip line 311.

In this embodiment, the third sliding dielectric plate 370 slides relative to the first side phase-shifting strip line 311, to change a phase of a signal in the first side phase-shifting strip line 311. The reflective side plate 130, the third sliding dielectric plate 370, the first side phase-shifting strip line 311, and the second insulation side plate 214 form a phase shifter 330*c*. A reference ground of the phase shifter 330*c* is only the reflective side plate 130, in other words, the reflective side plate 130 is a single-side reference ground of the phase shifter 330*c*. A phase shifter 330 and the phase shifter 330*c* may simultaneously adjust a phase of a signal, to adjust a radiation direction of a signal in a radiating element 500.

Figure 30:
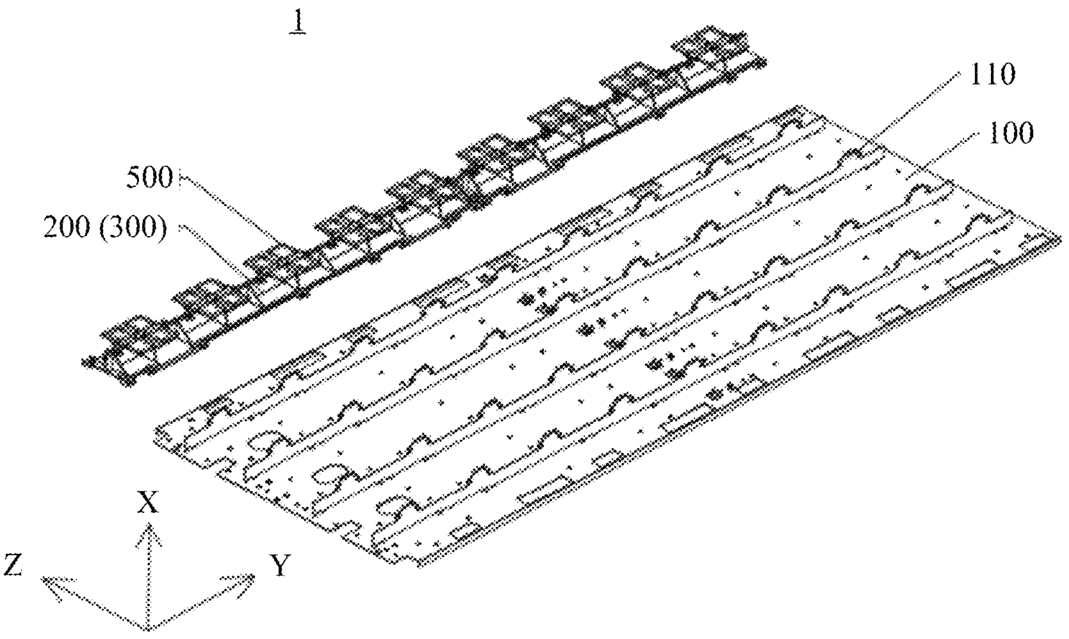
FIG. 30 is a diagram of a structure of an antenna according to an embodiment of this disclosure.
Figure 31:
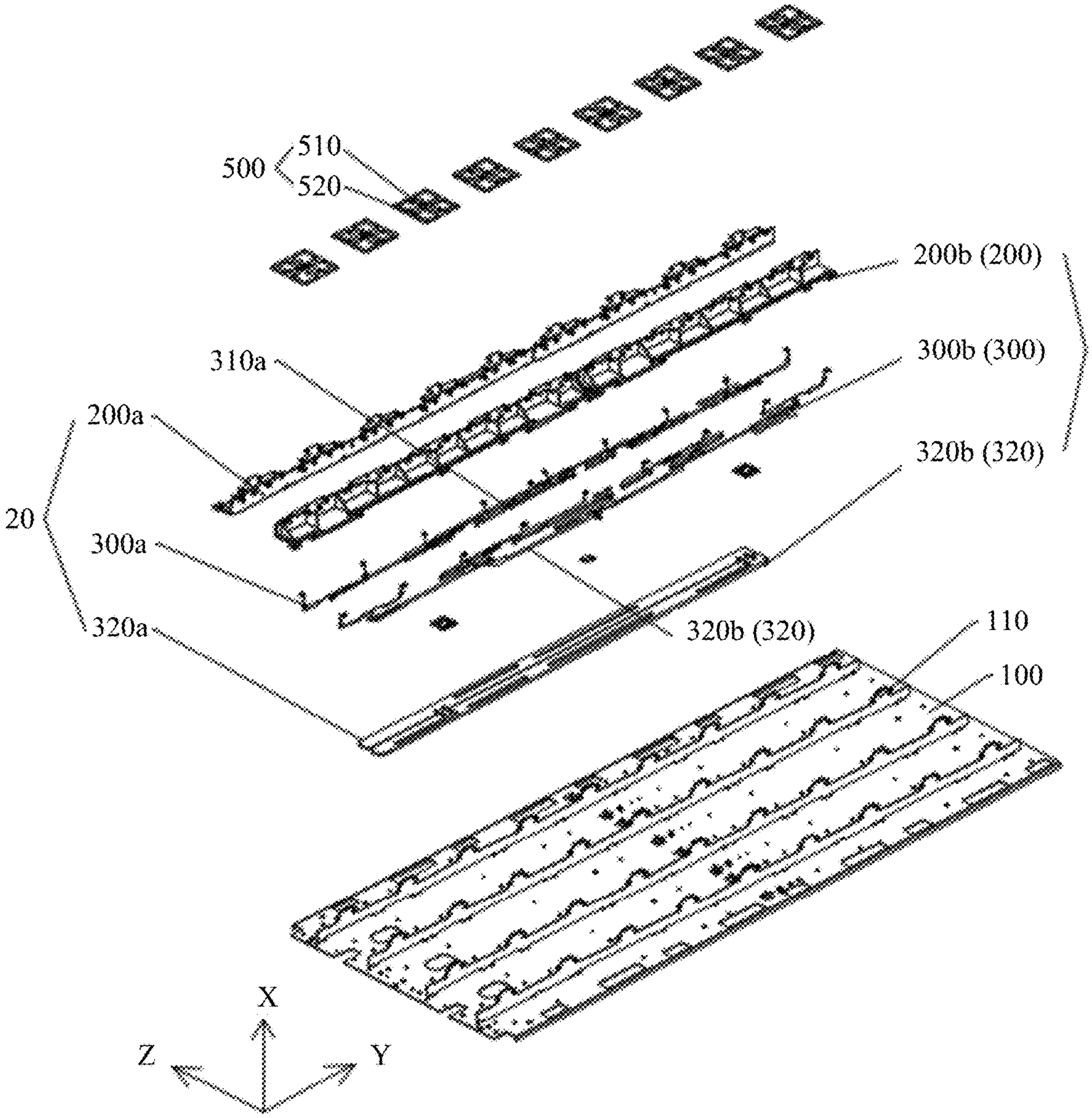
FIG. 31 is an exploded view of an antenna according to an embodiment of this disclosure.
Figure 32:
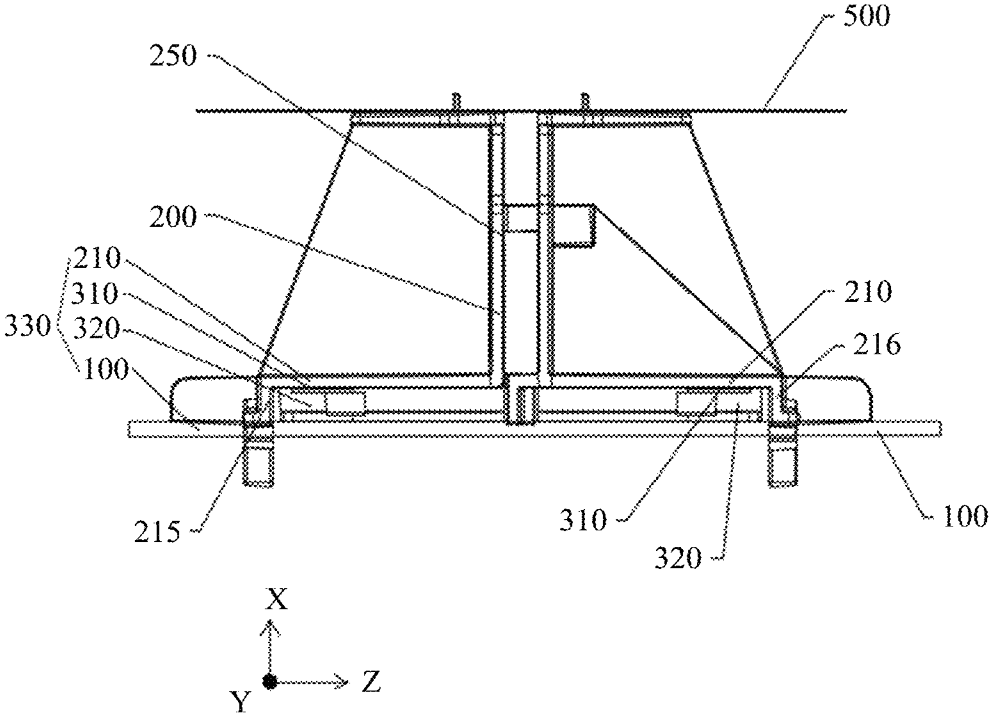
FIG. 32 is a side view of an antenna according to an embodiment of this disclosure.
Figure 33:
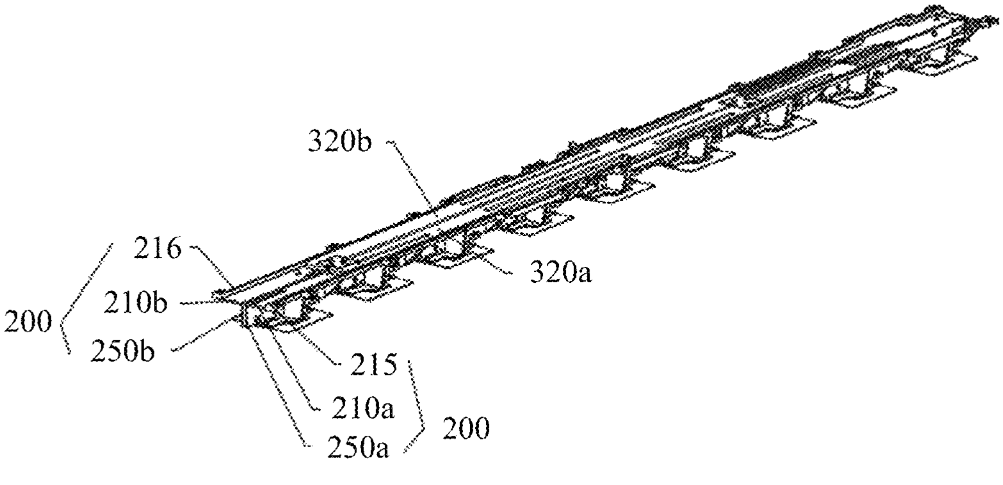
FIG. 33 is a diagram of a structure of an antenna without a reflector according to an embodiment of this disclosure.
Figure 34:
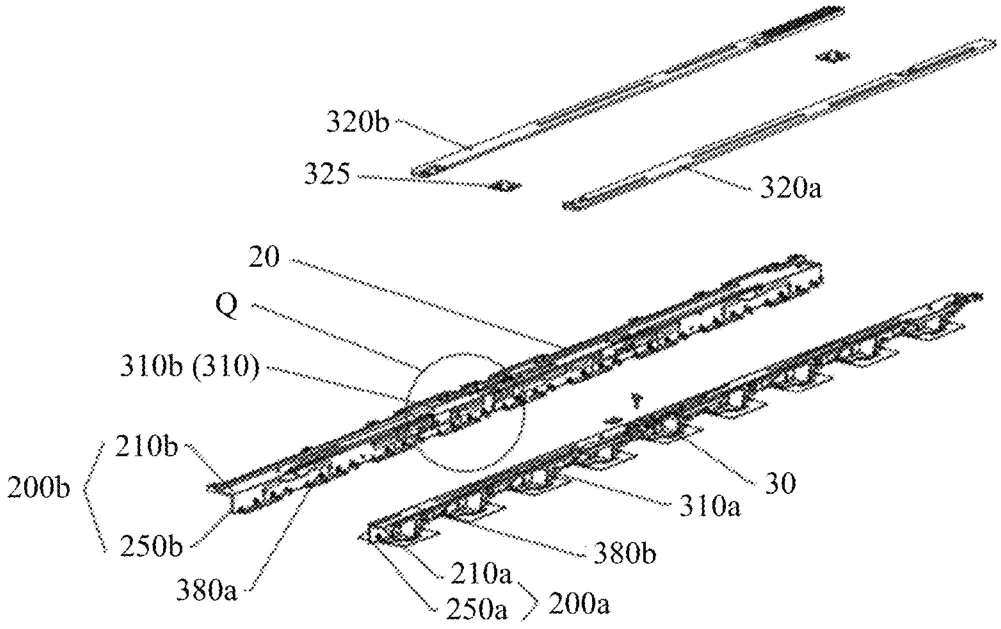
FIG. 34 is an exploded view of an antenna without a reflector according to an embodiment of this disclosure.
Figure 35:
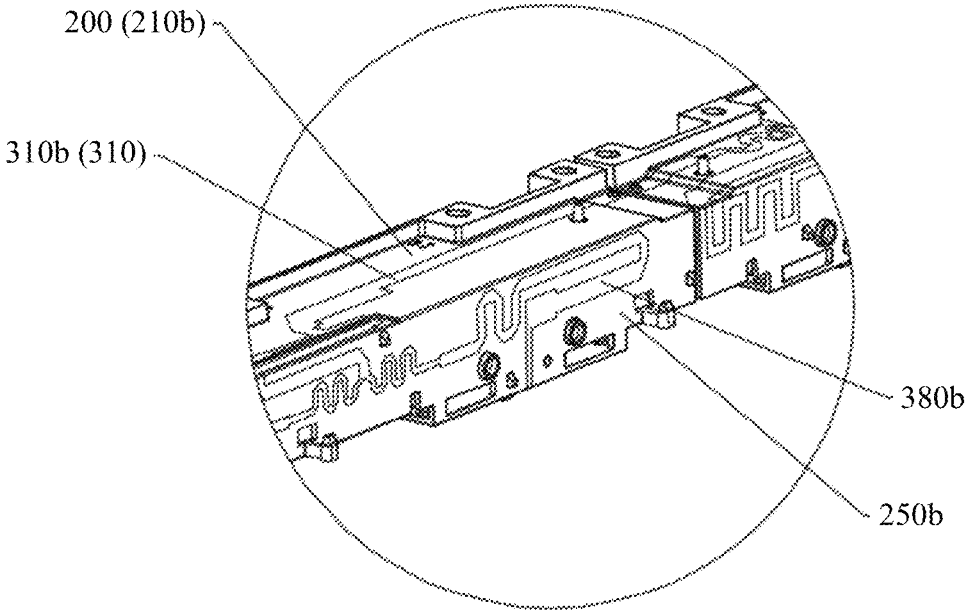
FIG. 35 is a locally enlarged diagram of a part Q in FIG. 34.

FIG. 30 is a diagram of a structure of an antenna according to another possible embodiment of this disclosure based on FIG. 4 to FIG. 7. FIG. 30 is a diagram of a three-dimensional structure of a reflector and another part in an antenna. FIG. 31 is an exploded view of the antenna without the reflector 100 in FIG. 30. FIG. 32 is a side view of the antenna 1 in FIG. 30. FIG. 33 is a diagram of a structure of the antenna 1 without the reflector 100 in FIG. 30. FIG. 34 is a split diagram based on FIG. 33. FIG. 35 is a locally enlarged diagram of a part Q in FIG. 34. Different from the embodiment shown in FIG. 4 to FIG. 7, a phase-shifting strip line 310 and an insulation support bracket 200 are of an integrated structure (as shown in FIG. 34 and FIG. 35). In a possible implementation, the insulation support bracket 200 and a circuit part, other than a first sliding dielectric plate 320, in a feed network 300 are of an integrated structure, so that a size of the antenna 1 can be greatly reduced, and a structure is simpler. In an implementation, the insulation support bracket 200 and the circuit part, other than the first sliding dielectric plate 320, in the feed network 300 may be formed through integrated injection molding, or the feed network 300 is formed by electroplating a metal on the insulation support bracket 200 with reference to an etching pattern process.

In this embodiment, the phase-shifting strip line 310 is located on a surface that is of a first insulation support plate 210 and that faces the reflector 100. A phase shifter 330 of the feed network 300 includes the first insulation support plate 210, the phase-shifting strip line 310, the first sliding dielectric plate 320, and the reflector 100 (as shown in FIG. 32). In this embodiment, a reference ground of the phase shifter 330 is also a single-side reference ground.

Still refer to FIG. 32. In this embodiment, the insulation support bracket 200 further includes a second insulation support plate 250, the second insulation support plate 250 is connected to and intersects with the first insulation support plate 210, the second insulation support plate 250 is located on a side that is of the first insulation support plate 210 and that is away from the reflector 100, and a part, other than the phase-shifting strip line 310, in the feed network 300 is located on the second insulation support plate 250. In this implementation, a cross-section of the insulation support bracket 200 is in an "L" shape. In some implementations, the cross-section of the insulation support bracket 200 is in a straight-line shape, in other words, the insulation support bracket 200 is approximately in a flat shape (not shown in the figure). The feed network 300 is disposed on a surface that is of the insulation support bracket 200 and that faces the reflector 100. In some other implementations, the insulation support bracket 200 may alternatively be in another shape. This may be set based on an actual requirement.

With reference to FIG. 31 and FIG. 34, in this embodiment, the antenna 1 is a dual-polarized antenna, and the dual-polarized antenna includes a first antenna structure 20 and a second antenna structure 30 that are adjacent. A feed network 300 in the first antenna structure 20 is a positive-polarized feed network 300*a*, and a feed network 300 in the second antenna structure 30 is a negative-polarized feed network 300*b*. Phase-shifting strip lines in the positive-polarized feed network 300*a* and the negative-polarized feed network 300*b* are respectively a phase-shifting strip line 310*a* and a phase-shifting strip line 310*b*. Insulation support brackets 200 in the first antenna structure 20 and the second antenna structure 30 are respectively a first insulation support bracket 200*a* and a second insulation support bracket 200*b*. The first insulation support bracket 200*a* includes a second insulation support plate 250*a* and a first insulation support plate 210*a* that are connected and intersect (as shown in FIG. 34). The second insulation support bracket 200*b* includes a second insulation support plate 250*b* and a first insulation support plate 210*b* that are connected and intersect (as shown in FIG. 34). A ground plate 110 is disposed between the second insulation support plate 250*a* and the second insulation support plate 250*b*. With reference to FIG. 34 and FIG. 35, in FIG. 34, the ground plate 110 is omitted between the first antenna structure 20 and the second antenna structure 30. A first circuit part 380*a*, other than the phase-shifting strip line 310*a*, in the positive-polarized feed network 300*a* is located on a surface that is of the second insulation support plate 250*a* and that faces the ground plate 110. A second circuit part 380*b*, other than the phase-shifting strip line 310*b*, in the negative-polarized feed network 300*b* is located on a surface that is of the second insulation support plate 250*b* and that faces the ground plate 110. In this embodiment, the ground plate 110 is located between the second insulation support plate 250*a* and the second insulation support plate 250*b*. In an aspect, the ground plate 110 is used as a reference ground of the first circuit part 380*a* and the second circuit part 380*b*. In another aspect, a case in which the first circuit part 380*a* and the second circuit part 380*b* are excessively close to each other and affect signal transmission can be avoided.

In some implementations, the ground plate 110 may alternatively be located on outer sides of the second insulation support plate 250*a* and the second insulation support plate 250*b*, provided that the ground plate 110 can be used as the reference ground of the first circuit part 380*a* and the second circuit part 380*b*.

Figure 36:
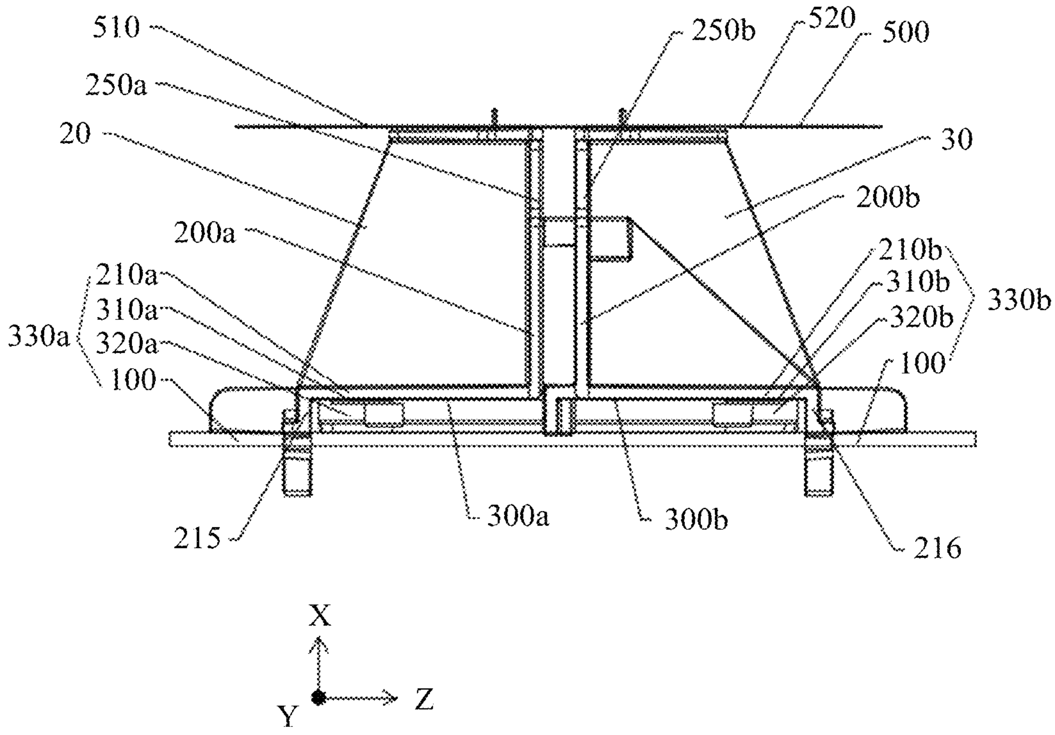
FIG. 36 is a side view of an antenna according to an embodiment of this disclosure.

With reference to FIG. 31 and FIG. 36, FIG. 36 is a side view of the antenna in FIG. 31. In this embodiment, the first antenna structure 20 and the second antenna structure 30 further respectively include a positive-polarized radiating sub-element 510 and a negative-polarized radiating sub-element 520. In other words, a radiating element 500 of the dual-polarized antenna includes the positive-polarized radiating sub-element 510 and the negative-polarized radiating sub-element 520. The positive-polarized radiating sub-element 510 is connected to the positive-polarized feed network 300*a*, the negative-polarized radiating sub-element 520 is connected to the negative-polarized feed network 300*b*, and the positive-polarized radiating sub-element 510 and the negative-polarized radiating sub-element 520 are respectively fastened to an end of the second insulation support plate 250*a* and an end of the second insulation support plate 250*b* that are away from the reflector 100. An end that is of the ground plate 110 and that is away from the reflector 100 extends between the positive-polarized radiating sub-element 510 and the negative-polarized radiating sub-element 520, so that the ground plate 110 is used as a reference ground of the positive-polarized radiating sub-element 510 and the negative-polarized radiating sub-element 520.

A manner of fastening the positive-polarized radiating sub-element 510 and the negative-polarized radiating sub-element 520 to the second insulation support plate 250*a* and the second insulation support plate 250*b* includes welding, clamping, using a rivet, using a screw, hot riveting, or the like. In some implementations, the radiating element 500 and the feed network 300 may be integrally electroplated on the insulation support bracket 200.

Still refer to FIG. 36. In this embodiment, both the first antenna structure 20 and the second antenna structure 30 include first sliding dielectric plates, which are respectively denoted as a first sliding dielectric plate 320*a* and a first sliding dielectric plate 320*b*. A third insulation side plate 215 is disposed on a surface that is of the first insulation support plate 210*a* and that faces the first sliding dielectric plate 320*a*, the third insulation side plate 215 and the first sliding dielectric plate 320*a* extend in a same direction, and the third insulation side plate 215 is located on a side that is of the first insulation support plate 210*a* and that is away from the ground plate 110. A fourth insulation side plate 216 is disposed on a surface that is of the first insulation support plate 210*b* and that faces the first sliding dielectric plate 320*b*, the fourth insulation side plate 216 and the first sliding dielectric plate 320*b* extend in a same direction, and the fourth insulation side plate 216 is located on a side that is of the first insulation support plate 210*b* and that is away from the ground plate 110. The third insulation side plate 215 is configured to guide the first sliding dielectric plate 320*a* to slide in a second direction Y, and the fourth insulation side plate 216 is configured to guide the first sliding dielectric plate 320*b* to slide in the second direction Y. In this embodiment, a phase shifter 330*a* of the first antenna structure 20 includes the first insulation support plate 210*a*, the phase-shifting strip line 310*a*, the first sliding dielectric plate 320*a*, and the reflector 100. A phase shifter 330*b* of the second antenna structure 30 includes the first insulation support plate 210*b*, the phase-shifting strip line 310*b*, the first sliding dielectric plate 320*b*, and the reflector 100. The third insulation side plate 215, the fourth insulation side plate 216, the first insulation support plate 210*a*, and the first insulation support plate 210*b* are all made of an insulating material. A reference ground of the phase shifter 330*a* and the phase shifter 330*b* is the reflector 100, and is a single-side reference ground.

Still refer to FIG. 34. In a possible implementation, the first sliding dielectric plates 320*a* and 320*b* in the first antenna structure 20 and the second antenna structure 30 that are adjacent are fastened. The two first sliding dielectric plates 320*a* and 320*b* may be fastened by using a fastener 325, so that the two first sliding dielectric plates 320*a* and 320*b* can be simultaneously driven by a transmission mechanism 400. The fastener 325 may be of a flower structure, or may be in another shape. This may be set based on an actual requirement. A manner of fastening and connecting the two adjacent first sliding dielectric plates 320*a* and 320*b* further includes welding, clamping, using a rivet, using a screw, hot riveting, or the like.

Figure 37:
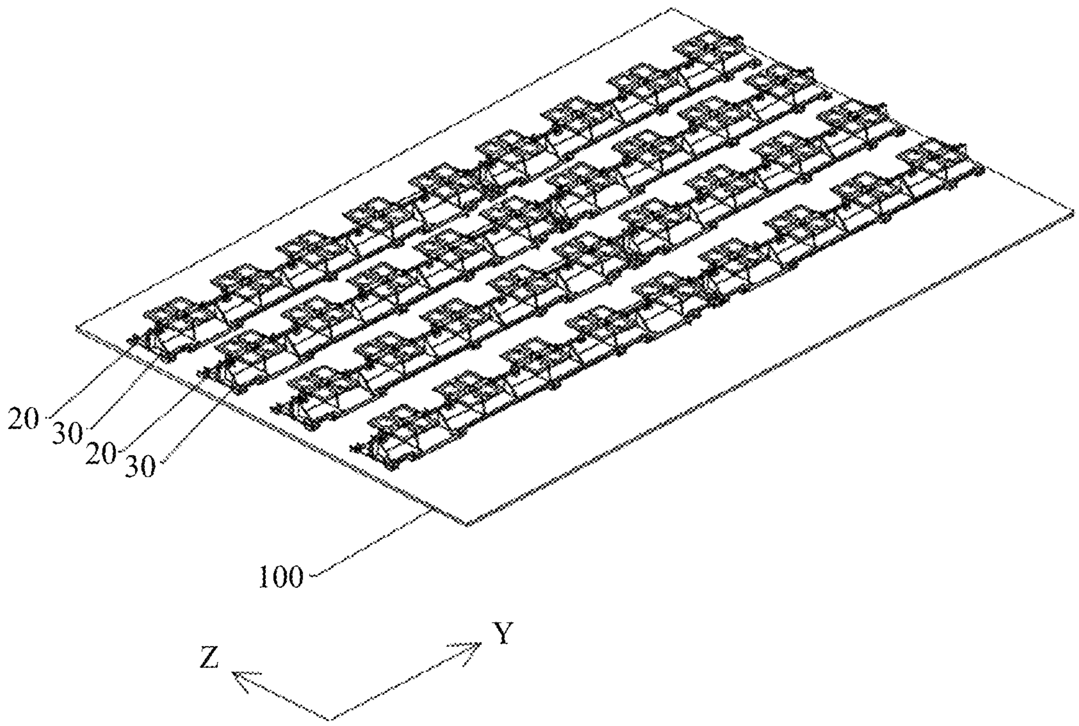
FIG. 37 is a diagram of a structure of an antenna according to an embodiment of this disclosure.

FIG. 37 is a diagram of a structure of an antenna according to another possible embodiment of this disclosure based on FIG. 30 to FIG. 36. Refer to FIG. 37. In this embodiment, the antenna 1 includes a dual-polarized antenna array, each dual-polarized antenna includes a first antenna structure 20 and a second antenna structure 30, and a plurality of dual-polarized antennas are arranged in a third direction Z.

Figure 38:
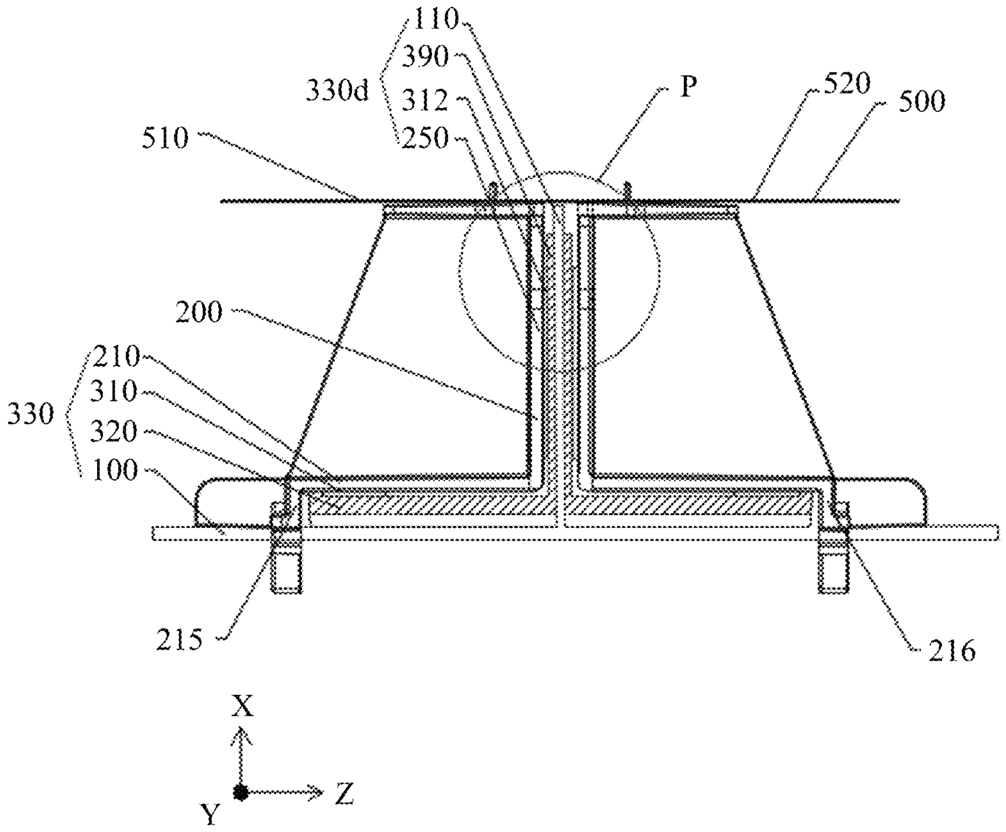
FIG. 38 is a side view of an antenna according to an embodiment of this disclosure.
Figure 39:
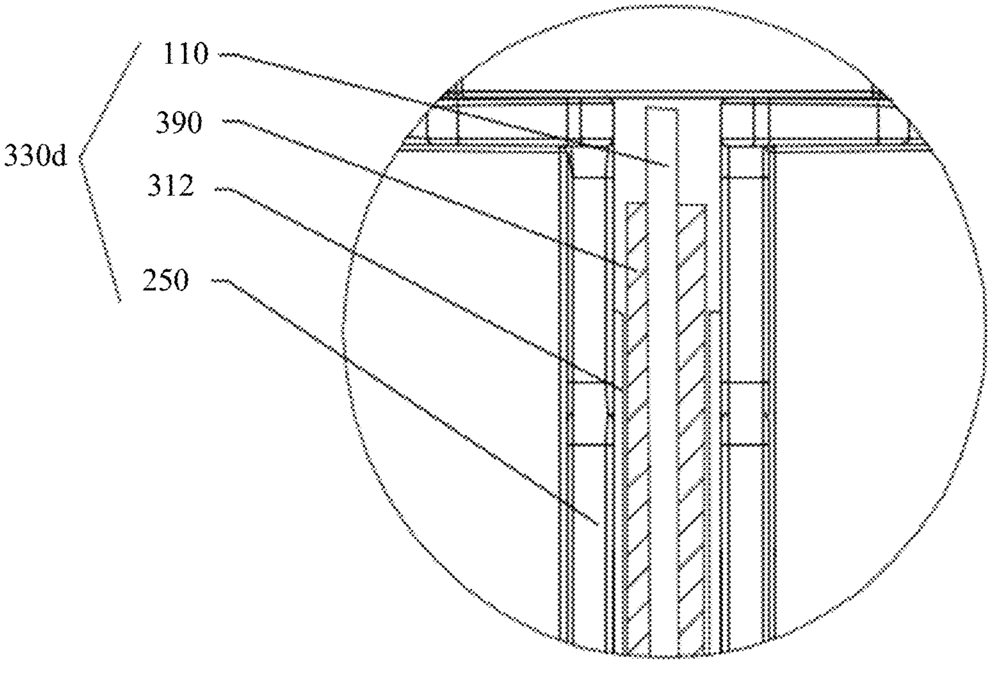
FIG. 39 is a locally enlarged diagram of a part P in FIG. 38.

FIG. 38 is a diagram of a structure of an antenna according to another possible embodiment of this disclosure based on FIG. 30 to FIG. 36. FIG. 39 is a locally enlarged diagram of a part P in FIG. 38. In an implementation, the antenna 1 further includes a fourth sliding dielectric plate 390, a feed network 300 further includes a second side phase-shifting strip line 312, the second side phase-shifting strip line 312 is located on a side that is of a second insulation support plate 250 and that faces a ground plate 110, and the fourth sliding dielectric plate 390 is located between the second side phase-shifting strip line 312 and the ground plate 110. In this embodiment, a first sliding dielectric plate 320 and the fourth sliding dielectric plate 390 are of an integrated structure, and cross-sections are in an “L” shape. The first sliding dielectric plate 320 and the fourth sliding dielectric plate 390 jointly affect a signal of the antenna 1. A first insulation support plate 210, a phase-shifting strip line 310, the first sliding dielectric plate 320, and a reflector 100 form a phase shifter 330. The second insulation support plate 250, the second side phase-shifting strip line 312, the fourth sliding dielectric plate 390, and the ground plate 110 form a phase shifter 330*d*. A reference ground of the phase shifter 330*d* is also a single-side reference ground, in other words, the ground plate 110 is the single-side reference ground of the phase shifter 330*d*. The phase shifter 330 and the phase shifter 330*d* separately adjust a phase of a signal, to adjust a radiation direction of a signal in a radiating element 500.

It should be noted that, in the embodiment shown in FIG. 30 to FIG. 36, and embodiments shown in FIG. 37 and FIG. 38, a protrusion portion may be further disposed and a groove may be further provided on, or a long hole may be further provided and a pin may be further disposed on the reflector 100 and the first sliding dielectric plate 320 in the antenna in each embodiment. The protrusion portion cooperates with the groove, or the long hole cooperates with the pin, to guide the first sliding dielectric plate 320 to slide. Details are not described herein again.

Refer to the foregoing descriptions to understand a cooperation function of the protrusion portion and the groove, and a cooperation function of the long hole and the pin.

In a possible implementation, a second sliding dielectric plate 340 may be further disposed between the phase-shifting strip line 310 and the reflector 100, and the first sliding dielectric plate 320 and the second sliding dielectric plate 340 jointly affect a phase of a signal in the phase-shifting strip line 310.

Figure 40:
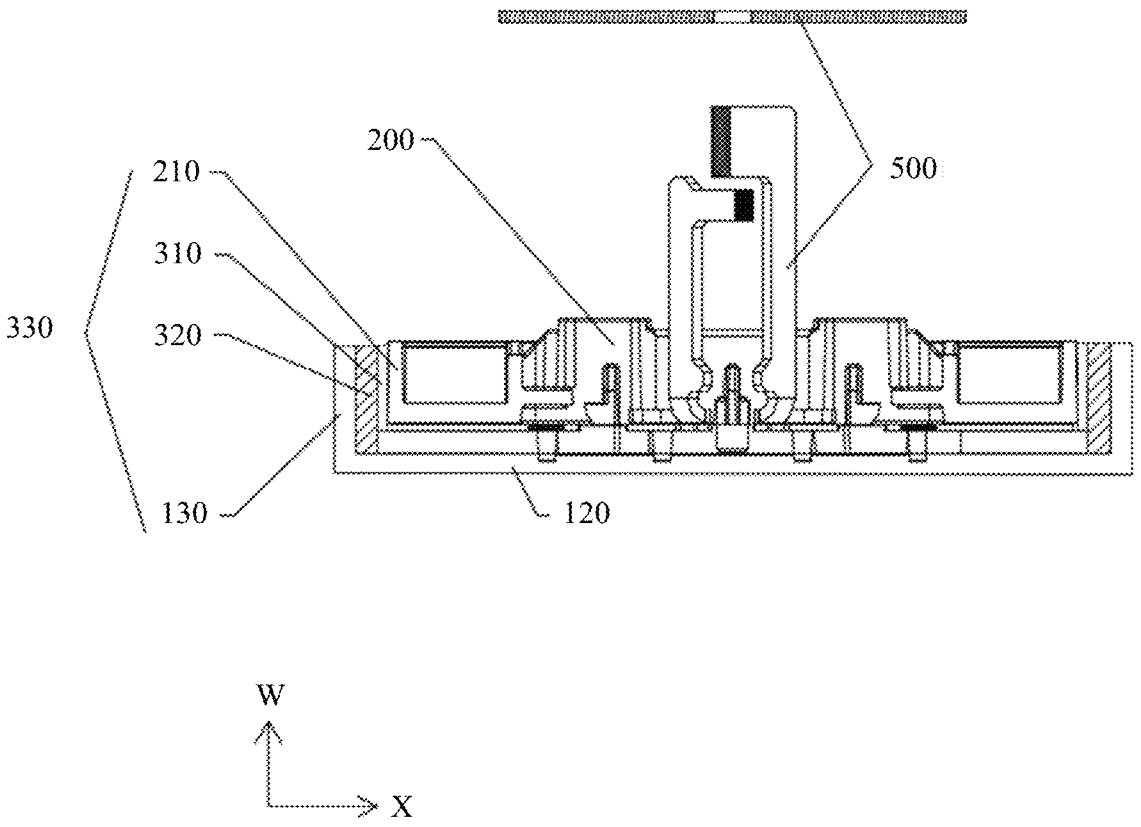
FIG. 40 is a side view of an antenna according to an embodiment of this disclosure.

FIG. 40 is a diagram of a structure of an antenna according to another possible embodiment of this disclosure. Refer to FIG. 40. In an embodiment, a reflector 100 includes a reflector body 120 and a reflective side plate 130. The reflective side plate 130 is located at an edge of the reflector body 120, and is connected to and intersects with the reflector body 120. An insulation support bracket 200, a feed network 300, and a radiating element 500 are located on a side of the reflector body 120 in a fourth direction W. A first insulation support plate 210, a phase-shifting strip line 310, a first sliding dielectric plate 320, and the reflective side plate 130 are sequentially disposed in a first direction X. In this implementation, the first direction X is parallel to the reflector body 120, and the first direction X vertically intersects with the fourth direction W. A phase shifter 330 of the feed network 300 includes the first insulation support plate 210, the phase-shifting strip line 310, the first sliding dielectric plate 320, and the reflective side plate 130.

A reference ground of the phase shifter 330 is a single-side reference ground.

In a possible implementation, a protrusion portion may be disposed and a groove may be provided on, or a long hole may be provided and a pin may be disposed on the reflective side plate 130 and the first sliding dielectric plate 320. The protrusion portion cooperates with the groove, or the long hole cooperates with the pin, to guide the first sliding dielectric plate 320 to slide. Details are not described herein again. Refer to the foregoing descriptions to understand a cooperation function of the protrusion portion and the groove, and a cooperation function of the protrusion portion and the groove.

In the antenna 1 in this disclosure, in an aspect, the reflector 100 is used as a reference ground of the phase shifter 330, and no additional metal plate or metal cavity is required as the reference ground of the phase shifter 330, so that a structure of the antenna 1 can be simplified and costs can be reduced. In another aspect, the reference ground of the phase shifter 330 in this disclosure is a single-side reference ground, and the first insulation support plate 210 is on another side of the phase-shifting strip line 310. Compared with a phase shifter that is in a metal cavity shape and is a double-side reference ground, a material of the first insulation support plate 210 is lighter, and can make the antenna 1 be more lightweight. In still another aspect, the first insulation support plate 210 in the insulation support bracket 200 configured to fasten the feed network 300 may be configured to limit a position of the first sliding dielectric plate 320, to ensure stability of the phase shifter 330, further improve integration of the antenna 1, and implement miniaturization of the antenna. A protrusion portion may be disposed and a groove may be provided on, or a long hole may be provided and a pin may be disposed on the first sliding dielectric plate 320, the first insulation support plate 210, and the reflector 100, to implement a guiding function. A protrusion portion may be disposed and a groove may be provided on, or a long hole may be provided and a pin may be disposed on a second sliding dielectric plate 340 and the first insulation support plate 210, to implement a guiding function. The phase-shifting strip line 310 and the insulation support bracket 200 are integrally formed, to further simplify the structure of the antenna 1, and make the antenna 1 be more miniaturized and lightweight.

The antenna and the base station provided in embodiments of this disclosure are described above in detail. The principle and embodiments of this disclosure are described herein through specific examples. The descriptions about embodiments are merely provided to help understand the method and core ideas of this disclosure. In addition, a person of ordinary skill in the art can make modifications in terms of the specific embodiments and disclosure scopes according to the ideas of this disclosure. Therefore, the content of this specification shall not be construed as a limit to this disclosure.

What is claimed is:

1. An antenna, comprising:

a reflector;

an insulation support bracket located on a side of the reflector and comprising a first insulation support plate; and a feed network connected to the insulation support bracket, wherein the feed network and the insulation support bracket are located on the same side of the reflector, and the feed network comprises a phase-shifting strip line and a first sliding dielectric plate, wherein the first insulation support plate, the phase-shifting strip line, the first sliding dielectric plate, and the reflector are sequentially disposed in a first direction.

2. The antenna of claim 1, wherein a reference ground of the phase-shifting strip line is the reflector.

3. The antenna of claim 1, wherein the insulation support bracket further comprises a first insulation side plate located on a side that is of the first insulation support plate and that faces the reflector, the first insulation side plate and the phase-shifting strip line are disposed side by side, both the first insulation side plate and the phase-shifting strip line extend in a second direction, and the second direction intersects with the first direction.

4. The antenna of claim 1, wherein a surface that is of the first sliding dielectric plate and that faces the phase-shifting strip line is further provided with an accommodation groove, and the phase-shifting strip line is at least partially located in the accommodation groove.

5. The antenna of claim 1, wherein the first sliding dielectric plate is provided with a first hole that penetrates the first sliding dielectric plate, the first hole extends in the second direction, a plurality of first pins arranged in the second direction are disposed on a surface that is of the first insulation support plate and that faces the reflector, the first pin passes through the first hole and can slide relative to the first hole, and the second direction intersects with the first direction and is the same as an extension direction of the first sliding dielectric plate.

6. The antenna of claim 1, wherein the first sliding dielectric plate is provided with a second hole that penetrates the first sliding dielectric plate, the second hole extends in the second direction, a plurality of second pins arranged in the second direction are disposed on a surface that is of the reflector and that faces the first sliding dielectric plate, the second pin passes through the second hole and can slide relative to the second hole, and the second direction intersects with the first direction and is the same as the extension direction of the first sliding dielectric plate.

7. The antenna of claim 1, wherein a surface that is of the first sliding dielectric plate and that faces the reflector is provided with a first groove, a first protrusion portion is disposed on the surface that is of the reflector and that faces the first sliding dielectric plate, the first groove and the first sliding dielectric plate extend in the same direction, and the first protrusion portion is located in the first groove and can slide relative to the first groove.

8. The antenna of claim 1, wherein the antenna further comprises a second sliding dielectric plate located between the first insulation support plate and the phase-shifting strip line; that the first insulation support plate, the phase-shifting strip line, the first sliding dielectric plate, and the reflector are sequentially disposed in a first direction comprises: the first insulation support plate, the second sliding dielectric plate, the phase-shifting strip line, the first sliding dielectric plate, and the reflector are sequentially disposed in the first direction; and the second sliding dielectric plate is connected to the first sliding dielectric plate, wherein the first insulation support plate, the second sliding dielectric plate, the phase-shifting strip line, the first sliding dielectric plate, and the reflector are included in a phase shifter of the feed network.

9. The antenna of claim 8, wherein a surface that is of the second sliding dielectric plate and that faces the first insulation support plate is provided with a third groove, a third protrusion portion is disposed on a surface that is of the first insulation support plate and that faces the second sliding dielectric plate, the third groove and the second sliding dielectric plate extend in a same direction, and the third protrusion portion is located in the third groove and can slide relative to the third groove.

10. The antenna of claim 1, wherein the antenna further comprises a radiating element, the radiating element is fastened on a side that is of the insulation support bracket and that is away from the reflector, wherein the reflector, the feed network, the insulation support bracket, and the radiating element are sequentially disposed in the first direction.

11. The antenna of claim 1, wherein the phase-shifting strip line and the insulation support bracket are of an integrated structure.

12. The antenna of claim 1, wherein the phase-shifting strip line is located on the surface that is of the first insulation support plate and that faces the reflector, wherein the first insulation support plate, the phase-shifting strip line, the first sliding dielectric plate, and the reflector are included in a phase shifter of the feed network.

13. The antenna of claim 1, wherein the insulation support bracket further comprises a second insulation support plate, the second insulation support plate is connected to and intersects with the first insulation support plate, the second insulation support plate is located on a side that is of the first insulation support plate and that is away from the reflector, and a part, other than the phase-shifting strip line, in the feed network is located on the second insulation support plate.

14. A base station comprising an antenna and a radio frequency processing unit electrically connected to the antenna, wherein the antenna comprises:

a reflector;

an insulation support bracket located on a side of the reflector and comprises a first insulation support plate; and a feed network connected to the insulation support bracket, wherein the feed network and the insulation support bracket are located on the same side of the reflector, and the feed network comprises a phase-shifting strip line and a first sliding dielectric plate, wherein the first insulation support plate, the phase-shifting strip line, the first sliding dielectric plate, and the reflector are sequentially disposed in a first direction.

15. The base station of claim 14, wherein a reference ground of the phase-shifting strip line is the reflector.

16. The base station of claim 14, wherein the insulation support bracket further comprises a first insulation side plate, the first insulation side plate is located on a side that is of the first insulation support plate and that faces the reflector, the first insulation side plate and the phase-shifting strip line are disposed side by side, both the first insulation side plate and the phase-shifting strip line extend in a second direction, and the second direction intersects with the first direction.

17. The base station of claim 14, wherein a surface that is of the first sliding dielectric plate and that faces the phase-shifting strip line is further provided with an accommodation groove, and the phase-shifting strip line is at least partially located in the accommodation groove.

18. The base station of claim 14, wherein the first sliding dielectric plate is provided with a first hole that penetrates the first sliding dielectric plate, the first hole extends in the second direction, a plurality of first pins arranged in the second direction are disposed on a surface that is of the first insulation support plate and that faces the reflector, the first pin passes through the first hole and can slide relative to the first hole, and the second direction intersects with the first direction and is the same as an extension direction of the first sliding dielectric plate.

19. The base station of claim 14, wherein a surface that is of the first sliding dielectric plate and that faces the reflector is provided with a first groove, a first protrusion portion is disposed on the surface that is of the reflector and that faces the first sliding dielectric plate, the first groove and the first sliding dielectric plate extend in the same direction, and the first protrusion portion is located in the first groove and can slide relative to the first groove.

20. A communication system, comprising a base station, wherein the base station comprises an antenna and a radio frequency processing unit electrically connected to the antenna, wherein the antenna comprises:

a reflector;

an insulation support bracket located on a side of the reflector and comprises a first insulation support plate; and a feed network connected to the insulation support bracket, wherein the feed network and the insulation support bracket are located on the same side of the reflector, and the feed network comprises a phase-shifting strip line and a first sliding dielectric plate, wherein the first insulation support plate, the phase-shifting strip line, the first sliding dielectric plate, and the reflector are sequentially disposed in a first direction.

* * * * *